US008682835B1

(12) United States Patent
Bickford

(10) Patent No.: US 8,682,835 B1
(45) Date of Patent: Mar. 25, 2014

(54) ASSET SURVEILLANCE METHOD AND SYSTEM COMPRISING A DYNAMIC MODEL FRAMEWORK

(75) Inventor: Randall L. Bickford, Orangevale, CA (US)

(73) Assignee: Intellectual Assets LLC, Lake Tahoe, NV (US)

(*) Notice: Subject to any disclaimer, the term of this patent is extended or adjusted under 35 U.S.C. 154(b) by 1010 days.

(21) Appl. No.: 12/002,104

(22) Filed: Dec. 14, 2007

Related U.S. Application Data

(60) Provisional application No. 60/875,059, filed on Dec. 15, 2006.

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
None
See application file for complete search history.

(56) References Cited

U.S. PATENT DOCUMENTS

| | | | |
|---|---|---|---|
| 5,764,509 A * | 6/1998 | Gross et al. ...................... 700/29 |
| 5,987,399 A * | 11/1999 | Wegerich et al. .............. 702/183 |
| 6,119,111 A * | 9/2000 | Gross et al. ...................... 706/15 |
| 6,202,038 B1 | 3/2001 | Wegerich et al. |
| 6,446,027 B1 | 9/2002 | O'Keeffe et al. |
| 6,609,036 B1 * | 8/2003 | Bickford ........................ 700/30 |
| 6,892,163 B1 * | 5/2005 | Herzog et al. ................ 702/181 |
| 6,898,469 B2 * | 5/2005 | Bickford ........................ 700/30 |
| 6,917,839 B2 * | 7/2005 | Bickford ........................ 700/30 |
| 6,952,662 B2 * | 10/2005 | Wegerich et al. ................. 703/2 |
| 6,975,962 B2 | 12/2005 | Wegerich et al. |
| 7,039,554 B2 | 5/2006 | Nguyen et al. |
| 7,082,379 B1 * | 7/2006 | Bickford et al. .............. 702/178 |
| 7,158,917 B1 * | 1/2007 | Bickford ...................... 702/181 |
| 7,233,886 B2 | 6/2007 | Wegerich et al. |
| 7,275,018 B2 | 9/2007 | Abu-El-Zeet et al. |
| 2003/0055607 A1 * | 3/2003 | Wegerich et al. ............. 702/188 |
| 2004/0006398 A1 * | 1/2004 | Bickford ........................ 700/30 |
| 2007/0005311 A1 * | 1/2007 | Wegerich et al. ................. 703/2 |
| 2007/0038838 A1 | 2/2007 | Greis et al. |

OTHER PUBLICATIONS

Willsky, A.S, A Survey of Design Methods for Failure Detection in Dynamic Systems, Automatica, vol. 12,pp. 601-611, Printed in Great Britan, 1976.
S. Zacks, Sequential Testing and Confidence Intervals for the MTBF of Systems having Exponential Distribution of the Interfailure Times, George Washington University, Report No. GWU/IMSE/Serial_T-506/85, 1985.
P.M. Frank, Fault Diagnosis in Dynamic Systems Via State Estimation, University of Duisburg, 1986.
K.C. Gross, et al, Sequential Probability Ratio Test for Nuclear Plant Component Surveillance, Nuclear Technology, vol. 93, p. 131, Feb. 1991.

(Continued)

*Primary Examiner* — Kakali Chaki
*Assistant Examiner* — Ababacar Seck
(74) *Attorney, Agent, or Firm* — Dennis A. DeBoo

(57) ABSTRACT

Asset surveillance method and system used in combination with a computer and memory for determining the condition of an asset using dynamically-selected estimation models for determining estimated data values in combination with dynamically-selected comparison models to more reliably determine the condition of the asset and to additionally determine the cause for any determined fault condition.

25 Claims, 17 Drawing Sheets

(56) References Cited

OTHER PUBLICATIONS

Singer, R.M. et al, A Pattern-recognition-based, Fault-tolerant Monitoring and Diagnostic Technique, 7th Symp. on Nuclear Reactor Surveillance, Jun. 1995, Printed in USA by Argonne National Laboratory.
A. Racz, Comments on the Sequential Probability Ratio Testing Methods, Annals of Nuclear Energy, vol. 23, No. 11, pp.919-934, 1996.
K. Kulacsy, Further Comments on the Sequential Probability Ratio Testing Methods, prepared for Annals of Nuclear Energy by the KFKI Atomic Energy Research Institute, Budapest, Hungary, Report No. KFKI-1996-10/G, 1996.
Bickford, R.L., et al, Real-Time Flight Data Validation for Rocket Engines, AIAA, 1996, Printed in USA by ExperTech & NYMA, Inc.
Wrest, D.J., et al., Instrument Surveillance and Calibration Verification through Plant Wide Monitoring Using Autoassociative Neural Networks, Specialists Meeting on Monitoring and Diagnosis Systems to Improve Nuclear Power Plant Reliability and Safety, May 1996, printed by the International Atomic Energy Agency.
R. M. Singer, et al, Model-Based Nuclear Power Plant Monitoring and Fault Detection: Theoretical Foundations, Proceedings. 9th International Conference on Intelligent Systems Applications to Power Systems, Seoul, Korea, 1997.
Willsky, A.S, A Survey of Design Methods for Failure Detection in Dynamic Systems, Automatica, vol. 12,pp. 601-611, Pergamon Press, Printed in Great Britan, 1976 (Year of publication is sufficiently earlier than the effective U.S. filing date and any foreign priority date so that the particular month of publication is not an issue).
S. Zacks, Sequential Testing and Confidence Intervals for the MTBF of Systems having Exponential Distribution of the Interfailure Times, Report No. GWU/IMSE/Serial_T-506/85, George Washington University, Dec. 23, 1985, Entire Report & Appendix pp. 1-23.
P.M. Frank, Fault Diagnosis in Dynamic Systems Via State Estimation, University of Duisburg, Department of Electrical Engineering Measurement and Control , Paper, pp. 35-85, Federal Republic of Germany, 1987 (Year of publication is sufficiently earlier than the effective, U.S. filed and any foreign priority date so that the particular month of publication is not an issue).
K.C. Gross, et al, Sequential Probability Ratio Test for Nuclear Plant Component Surveillance, Nuclear Technology, vol. 93, p. 131, U.S., Feb. 1991.
Singer, R.M., et al, A Pattern-recognition-based, Fault-tolerant Monitoring and Diagnostic Technique, 7th Symposium on Nuclear Reactor Surveillance, Jun. 1995, Entire Document, pp. 1-12, Printed in USA by Argonne National Laboratory.
A. Racz, Comments on the Sequential Probability Ratio Testing Methods, Annals of Nuclear Energy, vol. 23, No. 11, pp.919-934, 1996. (Year of publication is sufficiently earlier than the effective U.S. filing date and any foreign priority date so that the particular month of publication is not an issue).
K. Kulacsy,Further Comments on the Sequential Probability Ratio Testing Methods,prepared for Annals of Nuclear Energy by The KFKI Atomic Energy Research Institute,Budapest, Hungary,Report no. KFKI-1996-10/G, pp. 1-9,1996(Year of publication is sufficiently earlier than effective US filed and any foreign priority date so that particular month of publication is not an issue)
Bickford, R.L.. et al, Real-Time Flight Data Validation for Rocket Engines, American institute of Aeronautics and Astronautics Inc., 1996, Printed in USA by ExperTech & NYMA, Inc. (Year of publication is sufficiently earlier than the effective U.S. filing date and any foreign priority date so that the particular month of publication is not an issue), pp. 1-9.
Wrest, D.J., et al., Instrument Surveillance and Calibration Verification through Plant Wide Monitoring Using Autoassoctative Neural Networks, Specialists Meeting on Monitoring and Diagnosis Systems to Improve Nuclear Power Plant Reliability and Safety, U.K., May 1996, pp. 1-16, printed by the International Atomic Energy Agency.
R. M. Singer, et al, Model-Based Nuclear Power Plant Monitoring and Fault Detection: Theoretical Foundations, Proceedings. 9th International Conference on Intelligent Systems Applications to Power Systems, Seoul, Korea, Jul. 6-10, 1997, Entire Document pp. 1-7.
K.C. Gross, et al, Application of a Model-based Fault Detection System to Nuclear Plant Signals, Proceedings 9th International Congerence on Intelligent Systems Applications to Power Systems, Seoul, Korea, 1997.
Bickford, R.L., et al, Real-Time Sensor Validation for Autonomous Flight Control, AIAA, Jul. 1997, Printed in USA by Expert Microsystems, Inc. & Intelligent Software Associates, Inc. & Beoing Defense and Space Group.
Hines ,J.W, et al, "Signal Validation Using an Adaptive Neural Fuzzy Inference System", Nuclear Technology, pp. 181-193, Aug. 1997.
R. M. Singer, et al, Power Plant Surveillance and Fault Detection: Applications to a Commercial PWR, International Atomic Energy Agenct, IAEA-TECDOC-1054, pp. 185-200, Sep. 1997.
K. Kulacsy, Tests of the Bayesian Evaluation of SPRT Outcomes on PAKS NPP Data, KFKI Atomic Energy Research Institute, Budapest, Hungary, Report No. KFKI-1997-07/G, 1997.
J.P. Herzog, et al, Dynamics Sensor Validation for Reusable Launch Vehicle Propulsion, AIAA 98-3604, 34th Joint Propulsion Conference, Cleveland, Ohio, 1998.
Bickford, R.L., et al, Real-Time Sensor Validation for Propulsion Systems, American Institute of Aeronautics and Astronautics, 1998, Printed in USA by Expert Microsystems, Inc & Dynacs Engineering Co.
J.P. Herzog, et al, MSET Modeling of Crystal River-3 Venturi Flow Meters, 6th International Conference on Nuclear Engineering, 1998, Printed in the USA by ASME.
Bickford, R.L., et al, Real-Time Sensor Data Validation For Space Shuttle Main Engine Telemetry Monitoring, AIAA, Jun. 1999, Printed in USA by Expert Microsystems, Inc.& Intelligent Software Associates, Inc. & Dynacs Engineering Company & NASA Glenn Research Center.
Zavaljevski, N., et al, Support Vector Machines for Nuclear Reactor State Estimation, ANS Topical Mtg. on Advances in Reactor Physics, May 2000, Printed in USA by Argonne National Laboratory.
K.C. Gross, et al, Application of a Model-based Fault Detection System to Nuclear Plant Signals, Proceedings 9th International Conference on Intelligent Systems Applications to Power Systems, Seoul, Korea, Entire Document, pp. 1-5, May 1, 1997.
Bickford, R.L., et al, Real-Time Sensor Validaton for Autonomous Flight Control, American Instiute of Aeronautics and Astronautics, Printed in USA by Expert Microsystems, Inc. & Intellignet Software Associates, Inc. & Beoing Defense and Space Group, Entire Document, pp. 1-11, Jul. 1997.
Hines , J.W, et al, "Signal Validation Using an Adaptice Neural Fuzzy Inference System", Nuclear Technology, pp. 181-193, Aug. 1997.
R.M. Singer, et al, Power Plant Surveilance and Fault Detection: Applications to a Commercial PWR, International Atomic Energy Agency, IAEA-TECDOC-1054, pp. 185-200, Sep. 1997.
K. Kulacsy, Test of the Bayesian Evaluation of SPRT Outcomes on PAKS NPP Data, KFKI Atomic Energy Research Institute, Budapest, Hungary, Report No. KFKI-1997-07/G, Dec. 1997, Entire Document, pp. 1-21.
J.P. Herzog, et al, Dynamics Sensor Validation for Reusable Launch Vehicle Propulsion, American Insitute of Aeronautics and Astronautics 98-3604, 34th Joint Propulsion Conference, Cleveland, Ohio, Jul. 13, 1998, Entire Document, pp. 1-12.
Bickford, R.L., et al, Real-Time Sensor Validation For Propulsion Systems, American Institute of Aeronautics and Astronautics, Printed in USA by Expert Microsystems, Inc &Dynacs Engineering Co. pp. 1-7, 1998, (Year of publication is sufficiently earlier than the effective U.S. filing date and any foreign priority date so that the particular moth of the publication is not an issue).
J.P. Herzog, et al, MSET Modeling of Srystal River-3 Venturi Flow Meters, 6th International Conference on Nuclear Engineering, May 1998, Printed in USA by ASME, Entire Document-pp.1-17.
Bickford, R.L., et al, Real-Time Sensor Data Validation For Space Shuttle Main Engine Telemetry Monitoring, American Insitiute of Aeronautics and Astronautics, Jun. 1999, Printed in USA by Expert

(56) References Cited

OTHER PUBLICATIONS

Microsystems, Inc.& Intelligent Software Associates, Inc. & Dynacs Engineering Company & NASA Glenn Research Conter, pp. 1-9.

Zavaljevski, N., et al, Support Vector Machines for Nuclear Reactor State Estimation, ANS Topical Mtg. on Advances in Reactor Physics, May 2000, Printed in USA by Argonne National Laboratory, Entire Document-pp. 1-14.

Hines ,J.W, et al, "A Novel Approach to Process Modeling for Instrument Surveillance and Calibration Verification", International Topical Meeting on Nuclear Plant Instrumentation, Controls, and Human-Machine Interface Technologies (NPIC&HMIT 2000), Washington, DC, Nov. 2000.

Wegerich, S., et al, Challenges Facing Equipment Condition Monitoring Systems, MARCOM 2001, May 2001, Printed in USA by SmartSignal Corporation.

Bickford, R.L., et al, Online Signal Validation for Assured Data Integrity, 47th International Instrumentation Symposium, May 2001, Printed in USA by Expert Microsystems, Inc., and NASA Glenn Research Center.

Litt, J.S et al, A Survey of Intelligent Control and Health Management Technologies for Aircraft Propulsion Systems, NASA Glenn Research Center, Report No. NASA/TM-2005-213622, May 2005.

Bickford, R.L., et al, Ground Test Facility Implementation of a Real-Time Turbine Engine Diagnostic System, American Institute of Aeronautics and Astronautics (AIAA), 41$^{st}$ Joint Propulsion Conference, Jul. 2005, Printed in USA by AIAA.

Bickford, R.L., et all, Ground Test Data Validation Using a Subscale F/A-22 Engine Inlet Empirical Model,In Proceedings of GT2006, ASME Turbo Expo 2006: Power, for Land, Sea, and Air, May 2006, Barcelona, Spain.

Hines ,J.W, et al, "A Novel Approach to Process Modeling for Instrument Surveillance and Calibration Verification", International Topical Meeting on Nuclear Plant Instrumentation, Controls, and Human-Machine Interface Technologies (NPIC&HMIT 2000), Washington, DC, Nov. 2000, pp. 1-11.

Wegerich, S., et al, Challenges Facing Equipment Condition Monitoring Systems, MARCOM 2001, May 2001, Printed in USA by SmartSignal Corporation, pp. 1-11.

Bickford, R.L., et al, Online Signal Validation for Assured Data Integrity, 47th International Instrumentation Symposium, May 2001, Printed in USA by Expert Microsystems, Inc., and NASA Glenn Research Center, pp. 1-11.

Litt, J.S et al, A Survey of Intelligent Control and Health Management Technologies for Aircraft Propulsion Systems, NASA Glenn Research Center, Report No. NASA/TM-2005-213622, May 2005, Entire Document-pp. 1-24.

Bickford, R.L, et al, Ground Test Facility Implementation of a Real-Time Turbine Engine Diagnostic System, American Institute of Aeronautics and Astronautics (AIAA), 41$^{st}$ Joint Propulsion Conference, Jul. 2005, Printed in USA by AIAA, pp. 1-11.

Bickford, R.L., et all, Ground Test Data Validation Using a Subscale F/A-22 Engine net Empirical Model,In Proceedings of GT2006, ASME Turbo Expo 2006: Power, for Land, Sea, and Air, May 2006, Barcelona, Spain, pp. 1-15.

* cited by examiner

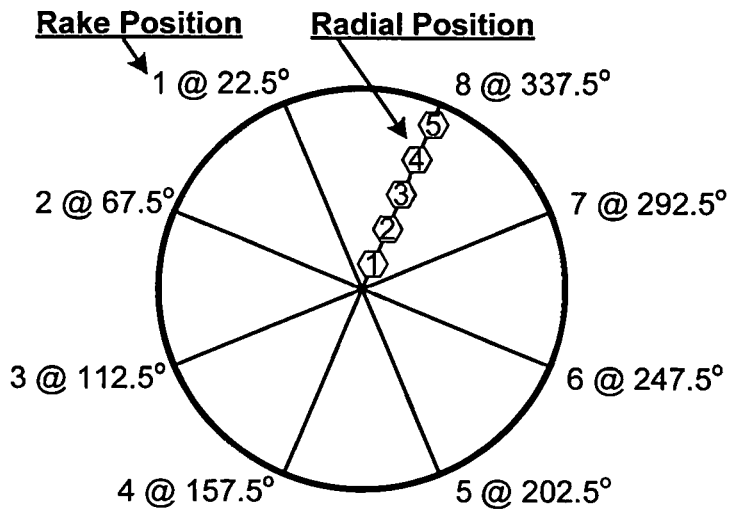

FIG. 8

| Signal Description | Signal Symbol |
|---|---|
| *Input Signals* | |
| Mach Number | M |
| Angle of Attack | ALPHA |
| Angle of Sideslip | BETA |
| Corrected Airflow | WC2 |
| *Monitored Signals* | |
| Average Engine-Face Total-Pressure Recovery | REC |
| Average Engine-Face RMS Turbulence | PTRMSPT2 |
| Circumferential Distortion Intensity | DPCAVG |
| Tip Radial Distortion Intensity | DPRTIP |
| Ratio of Individual Steady-State Total-Pressure to $Pt_0$, Free Stream Total-Pressure (i=Ring, j=Rake) | PREFPTij |
| Ratio of RMS of High Response Pressure to $Pt_2$, Engine-Face Total-Pressure (i=Ring, j=Rake) | RMSPT2ij |

FIG. 9

| Event Type | Reduction in Test Data Set Alarms |
|---|---|
| ICMP L3Retriever Ping | 100% |
| ICMP Ping NMAP | 100% |
| Evasive RST Detection | 100% |
| NETBIOS SMB IPC$ Share Access | 99.2% |
| SNMP Public Access UDP | 100% |
| TCP Checksum Changed on Retransmission | 100% |
| ICMP Large ICMP Packet | 100% |
| *OVERALL* | *99.9%* |

FIG. 20

ASSET SURVEILLANCE METHOD AND SYSTEM COMPRISING A DYNAMIC MODEL FRAMEWORK

CROSS-REFERENCE TO RELATED APPLICATIONS

This application claims priority to U.S. Provisional Patent Application No. 60/875,059, filed Dec. 15, 2006, the entire disclosure of which is incorporated herein by reference.

STATEMENT REGARDING FEDERALLY SPONSORED RESEARCH AND DEVELOPMENT

This invention was made with Government support under United States Air Force Small Business Innovation Research (SBIR) Contract No. F40600-02-C-0003 awarded by Arnold Engineering Development Center and under United States Department of Interior Small Business Innovation Research (SBIR) Contract No. NBCHC040099 awarded by the Homeland Security Advanced Research Projects Agency and is subject to the provisions of Public Law 96-517 (35 USC 202) and the Code of Federal Regulations 48 CFR 52.227-11, in which the contractor has elected to retain title. The Government has certain rights in the invention.

FIELD OF THE INVENTION

This invention relates generally to asset surveillance methods and systems and, in particular, to an asset surveillance method and system comprising a dynamic model framework.

BACKGROUND OF THE INVENTION

Products useful for determining or monitoring the condition of assets, including but not limited to equipment and processes, most often perform this surveillance function by evaluating signal or data values obtained during asset operation.

One means for determining or monitoring the condition of an asset involves estimating expected data values and comparing the estimated data values to current data values obtained from the asset. When the estimated data values characterize the desired or expected operation of the asset, a disagreement between the estimated data values and the current data values provides a sensitive and reliable indication of an asset fault condition and can further provide an indication of the particular cause of the asset fault.

Unfortunately, determining estimated data values that accurately characterize the desired or expected operation of an asset has proven to be a difficult or overly expensive problem for many types of assets thereby inhibiting the practical applications of products for determining or monitoring the condition of most assets.

Another shortcoming of the known prior-art is an inability to monitor the condition of assets using signal or data values whose availability changes dynamically during monitoring, such as signal or data sets having sometimes missing or incomplete values and signal or data sets whose contents change as asset operating environments are modified by owners or operators.

For the foregoing reasons, there is a need for an asset surveillance method and system that overcomes the significant shortcomings of the known prior-art as delineated hereinabove.

BRIEF SUMMARY OF THE INVENTION

In general, and in one aspect, an embodiment of the invention provides a novel and useful method and system to more accurately characterize the desired or expected operation of an asset by using in combination at least two models each characteristic of at least one operating attribute of the asset when it is known to be operating properly.

Additionally, and in one aspect, an embodiment of the invention is more suitable for data-driven modeling than are conventional single-model techniques because in one aspect, an embodiment of the invention uses selectable sets of estimation models for determining estimated data values in combination with selectable sets of comparison models to more reliably determine the condition of the asset and to additionally determine the cause for any determined fault condition.

Furthermore, and in one aspect, an embodiment of the invention provides a method for performing surveillance of an asset, said method comprising the steps of: populating a memory means with a plurality of different estimation models; obtaining a current data vector correlative to current asset operation wherein the current data vector is comprised of current data vector values; selecting an estimation model set from the plurality of different estimation models as a function of the current data vector; apportioning at least one current data vector value to at least one estimation model in the selected estimation model set; determining at least one estimated data vector value from each estimation model in the selected estimation model set for which at least one current data vector value is apportioned for obtaining an estimated data vector; and using the estimated data vector for performing asset surveillance.

In another aspect, an embodiment of the invention provides a method for performing surveillance of an asset, said method comprising the steps of: populating a memory means with a plurality of different comparison models; obtaining a current data vector correlative to current asset operation wherein the current data vector is comprised of current data vector values; selecting a comparison model set from the plurality of different comparison models as a function of the current data vector; apportioning at least one current data vector value to at least one comparison model in the selected comparison model set; determining at least one comparison feature vector value from each comparison model in the selected comparison model set for which at least one current data vector value is apportioned for obtaining a comparison feature vector; and using the comparison feature vector for performing asset surveillance.

In another aspect, an embodiment of the invention provides a method for performing surveillance of an asset, said method comprising the steps of: populating a memory means with a plurality of different comparison models; obtaining an estimated data vector correlative to current asset operation wherein the estimated data vector is comprised of estimated data vector values; selecting a comparison model set from the plurality of different comparison models as a function of the estimated data vector; apportioning at least one estimated data vector value to at least one comparison model in the selected comparison model set; determining at least one comparison feature vector value from each comparison model in the selected comparison model set for which at least one estimated data vector value is apportioned for obtaining a comparison feature vector; and using the comparison feature vector for performing asset surveillance.

In another aspect, an embodiment of the invention provides a method for performing surveillance of an asset, said method comprising the steps of: obtaining a set of different estimation models and storing the set of different estimation models in a memory means; obtaining a set of different comparison models and storing the set of different comparison models in the memory means; obtaining a current data vector correlative to current asset operation; selecting an estimation model set from the stored set of different estimation models as a function of the current data vector; determining an estimated data vector from the selected estimation model set and the current data vector; selecting a comparison model set from the stored set, of different comparison models as a function of at least the estimated data vector or the current data vector; determining a comparison feature vector from the selected comparison model set, the estimated data vector, and the current data vector; and using the comparison feature vector for performing asset surveillance.

In another aspect, an embodiment of the invention provides a system for performing surveillance of an asset, said system comprising: a memory device having a plurality of different estimation models stored thereby; means for acquiring a current data vector correlative to current asset operation wherein the current data vector is comprised of current data vector values; means for selecting an estimation model set from the plurality of different estimation models as a function of the current data vector; means for apportioning at least one current data vector value to at least one estimation model in the selected estimation model set; and means for determining at least one estimated data vector value from each estimation model in the selected estimation model set for which at least one current data vector value is apportioned for obtaining an estimated data vector for use in performing asset surveillance.

Accordingly, it should be apparent that numerous modifications and adaptations may be resorted to without departing from the scope and fair meaning of the claims as set forth herein below following the detailed description of the invention.

BRIEF DESCRIPTION OF THE DRAWINGS

FIG. 8 illustrates a wind tunnel engine inlet rake configuration shown forward looking aft.

FIG. 9 is a signal specification comprised of a list of signal symbols and correlative signal descriptions for an engine inlet flow descriptor surveillance model.

FIG. 20 illustrates the reduction in intrusion detection false alarms achieved in a computing system surveillance application.

DETAILED DESCRIPTION OF THE INVENTION

Figure 1:
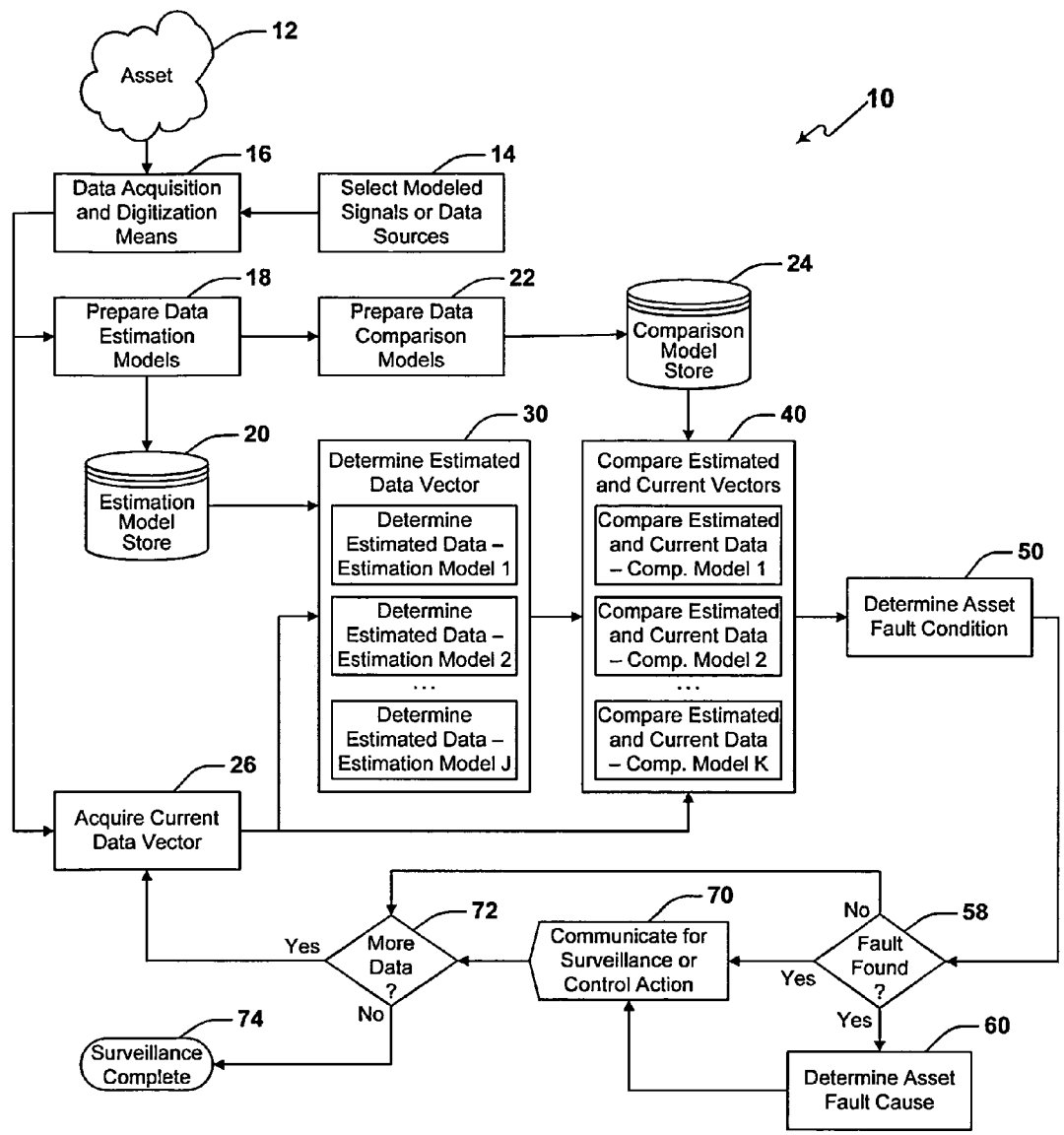
FIG. 1 is a schematic functional flow diagram of an embodiment of an asset surveillance method and system comprising a dynamic model framework.

Considering the drawings, wherein like reference numerals denote like parts throughout the various drawing figures, reference numeral 10 is directed to an asset surveillance method and system comprising a dynamic model framework.

Figure 2:
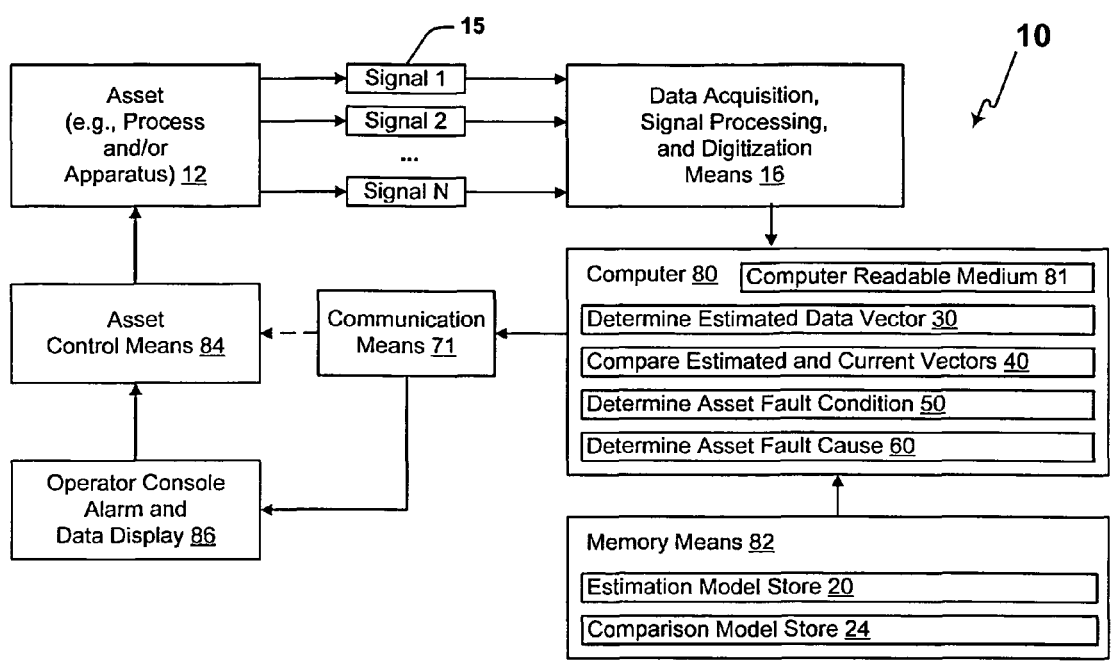
FIG. 2 is a block diagram of an embodiment of an asset surveillance method and system method comprising a dynamic model framework.

In general, and referring to FIGS. 1 and 2, an embodiment of the invention provides an asset surveillance method and system 10 used in combination with a computer 80 and a memory means 82 for determining the condition of an asset 12 and to additionally determine the cause for any determined fault condition. Estimated data values are determined for at least one signal or data source 15 characteristic of the desired or expected operation of the asset 12 given the current data values for the at least one signal or data source 15. The estimated data values are compared to the current data values to determine whether a fault condition exists with respect to the operation of the asset 12. If a degraded or fault condition of the asset 12 is found, the fault status of the asset is communicated to the asset operator or owner for surveillance and/or for enabling the asset operator or owner to take control action thereupon and/or for a control action to be taken automatically based on the fault status of the asset 12.

If a degraded or fault condition is found, the cause of the asset fault condition is additionally and optionally determined and then additionally communicated or indicated for the purpose of surveillance or for taking a control action.

More specifically, and referring to FIGS. 1 and 2, an embodiment of the asset surveillance method and system 10 is comprised of a select modeled signals or data sources procedure 14 used for selecting a set of signals or data sources 15 to be modeled by the asset surveillance method and system 10 wherein the number of selected signals or data sources is herein denoted by N.

In one embodiment, the selected signals or data sources 15 should exhibit or provide characteristics correlative to the desired or expected operation of the asset 12.

Additionally, and in one embodiment, the asset surveillance method and system 10 is further comprised of a data acquisition and digitization means 16 operatively coupled to both the computer 80 and to the asset 12 by way of signals or data sources 15 for acquiring a data vector set comprised of at least one reference data vector for signals or data sources 15 that characterize the expected operation of the asset 12.

Reference data vectors that characterize the expected operation of the asset 12 may be used as originally acquired or after any suitable transformation of the original acquired values. In one embodiment, it is preferable to normalize the acquired values so that all reference data values for the signals or data sources are of comparable magnitude, for example, to scale the signal or data source values to fall within the range between zero and one.

In one embodiment, the asset surveillance method and system 10 is further comprised of a prepare data estimation models procedure 18 for preparing a data estimation model set comprised of at least one data estimation model correlative to the data vector set comprised of at least one reference data vector for signals or data sources 15 that characterize the expected operation of the asset 12.

The asset surveillance method and system 10 is further comprised of a means for storing the estimation model set comprised of at least one data estimation model in an estimation model store 20 using the memory means 82.

In one embodiment, the asset surveillance method and system 10 is further comprised of a prepare data comparison models procedure 22 for preparing a comparison model set comprised of at least one data comparison model correlative to the reference data vector set comprised of at least one reference data vector and their corresponding estimated data vectors determined using the data estimation model set comprised of at least one data estimation model.

The asset surveillance method and system 10 is further comprised of a means for storing the comparison model set comprised of at least one data comparison model in a comparison model store 24 using the memory means 82.

The asset surveillance method and system 10 is further comprised of an acquire current data vector procedure 26 which employs the data acquisition and digitization means 16 for acquiring from the monitored asset 12 a current data vector, $\vec{X}_{obs}$, of n≤N modeled signals or data sources. Any transformation made to the acquired reference data vector values should also be applied to the current data vector values. In one aspect, the number of acquired current data values, n, might or might not equal the number of selected signals or data sources, N.

In one embodiment, the asset surveillance method and system 10 is further comprised of a determine estimated data vector procedure 30 for determining an estimated data vector, $\vec{X}_{est}$, containing a set of p estimated data values correlative to the current data values contained in the current data vector, $\vec{X}_{obs}$. In one aspect, the number of estimated data values, p, might or might not equal the number of acquired current data values, n, and further might or might not equal the number of selected signals or data sources, N. Additionally, and in one aspect, the number of estimated data values, p, might be less than or might be equal to the total number of possible estimated data values, P.

Figure 3:
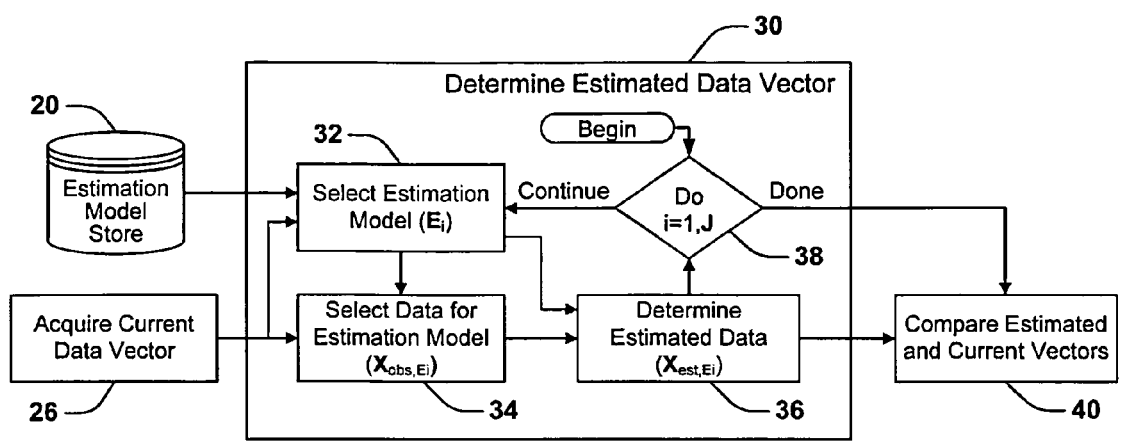
FIG. 3 is a schematic functional flow diagram further detailing a determine estimated data vector procedure.
Figure 4:
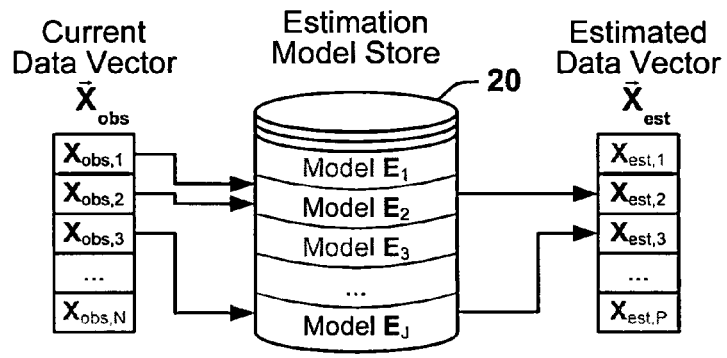
FIG. 4 illustrates the determination of an estimated data vector.

Referring now to FIGS. 3 and 4 and in one embodiment, the determine estimated data vector procedure 30 comprises a select estimation models procedure 32 receiving input from the estimation model store 20 and the acquire current data vector procedure 26 for selecting, under control of a decision do loop 38, a set of J estimation models (J≥1) based on the contents of the current data vector. For example, estimation models might be selected based on the magnitude or availability of one or more current data values in the current data vector or alternatively on any other criteria suitable for the in-use application.

In one embodiment, the determine estimated data vector procedure 30 comprises a select data for estimation models procedure 34 receiving input from the estimation model store 20 via the select estimation models procedure 32 and the acquire current data vector procedure 26 for apportioning, under control of a decision do loop 38, the current data values to the selected set of estimation models as necessary to accommodate data input requirements of the estimation models.

The apportioning of current data values to a selected set of estimation models is illustrated by example in FIG. 4. However, other apportioning methods suitable for in-use applications might be used.

In one embodiment, the determine estimated data vector procedure 30 comprises a determine estimated data procedure 36 receiving input from the select estimation models procedure 32 and the select data for estimation models procedure 34 for determining, under control of a decision do loop 38, the estimated data vector, $\vec{X}_{est}$, containing the set of p estimated data values.

Referring now to FIGS. 1 and 2, and in one embodiment, the asset surveillance method and system 10 is further comprised of a compare estimated and current vectors procedure 40 for comparing the data values contained in the estimated data vector, $\vec{X}_{est}$, to the data values contained in the current data vector, $\vec{X}_{obs}$, to est determine a comparison feature vector, $\vec{R}$, containing a set of m comparison feature values. In one aspect, the number of comparison feature values, m, might or might not equal the number of estimated data values, p, additionally might or might not equal the number of acquired current data values, n, and further might or might not equal the number of selected signals or data sources, N.

Figure 5:
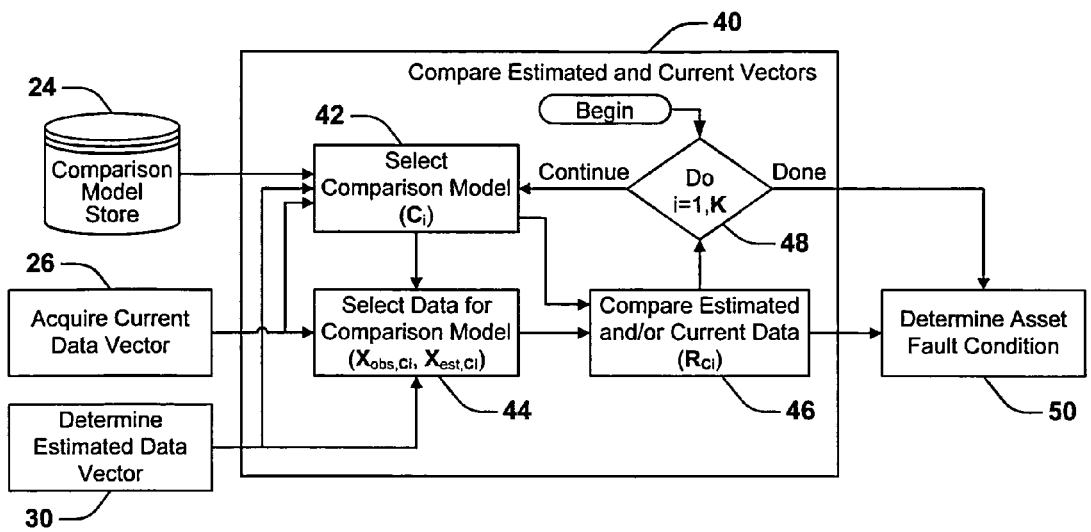
FIG. 5 is a schematic functional flow diagram further detailing a compare estimated data vector and current data vector procedure.
Figure 6:
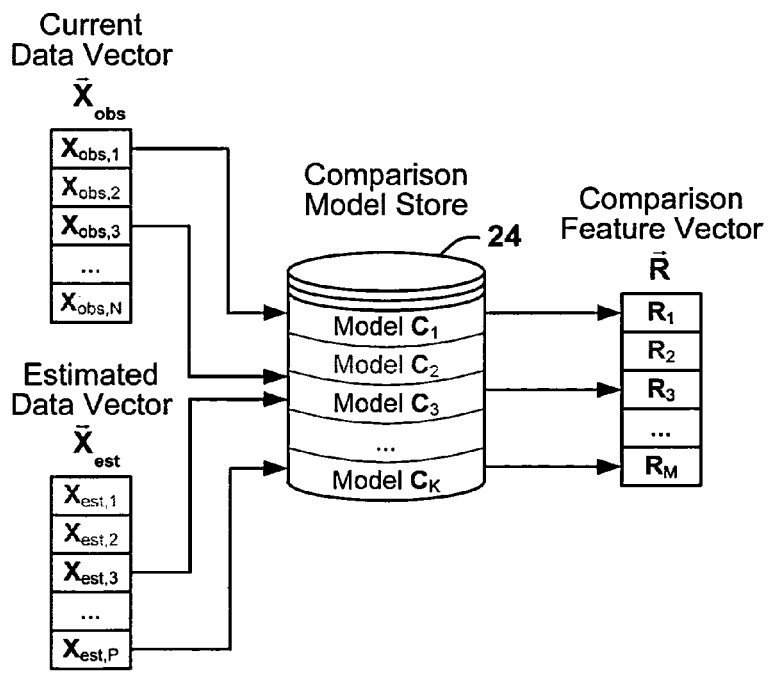
FIG. 6 illustrates the determination of a comparison feature vector.

Referring now to FIGS. 5 and 6, and in one embodiment, the compare estimated and current vectors procedure 40 comprises a select comparison models procedure 42 receiving input from the comparison model store 24 and the acquire current data vector procedure 26 for selecting, under control of a decision do loop 48, a set of K comparison models (K≥1) based on the contents of the current data vector, the estimated data vector, or both the current data vector and the estimated data vector. For example, comparison models might be selected based on the magnitude or availability of one or more current data values in the current data vector, on the magnitude or availability of one or more estimated data values in the estimated data vector, on the magnitude or availability of one or more current data values in the current data vector and on the magnitude or availability of one or more estimated data values in the estimated data vector, or on any other criteria suitable for the in-use application.

In one embodiment, the compare estimated and current vectors procedure 40 comprises a select data for comparison models procedure 44 receiving input from the comparison model store 24 via the select comparison models procedure 42, the acquire current data vector procedure 26, and the determine estimated data vector procedure 30 for apportioning, under control of a decision do loop 48, the estimated data values and the current data values to the selected set of comparison models as necessary to accommodate data input requirements of the comparison models.

The apportioning of estimated data values and current data values to a selected set of comparison models is illustrated by example in FIG. 6. However, other suitable apportioning or dividing out and sharing methods may be used for in-use applications.

In one embodiment, the compare estimated and current vectors procedure 40 comprises a compare estimated and current data procedure 46 receiving input from the select comparison models procedure 42 and the select data for comparison models procedure 44 for determining, under control of a decision do loop 48, the comparison feature vector, $\vec{R}$, containing the set of m comparison feature values. In one aspect, the number of comparison feature values, m, might be less than or might be equal to the total number of possible comparison feature values, M.

Referring now to FIGS. 1 and 2, and in one embodiment, the asset surveillance method and system 10 is further comprised of a determine asset fault condition procedure 50 for determining whether the results of the compare estimated and current vectors procedure 40 are indicative of a degraded or fault condition of the asset 12. For example, compare one or more individual comparison feature values, $R_i$, contained in the comparison feature vector, $\vec{R}$, to one or more threshold limits to determine if one or more limits are exceeded for one or more signals or data sources 15.

In one embodiment, the asset surveillance method and system 10 is further comprised of a fault found procedure 58 that determines if a degraded or fault condition of the asset 12 is present based on the results of the determine asset fault condition procedure 50 and if the fault found procedure 58 determines that a degraded or fault condition of the asset 12 is present, indicate the fault status of the asset using a communicate for surveillance or control action procedure 70 is implemented by way of a communication means 71 for the purpose of informing the asset operator or owner of the surveillance result via, for example, the operator console alarm and data display 86 for enabling the asset operator or owner to take control action thereupon via, for example, asset control means 84 and/or for the purpose of directly enabling an automated control action via the asset control means 84.

In one embodiment, if the fault found procedure 58 determines that a degraded or fault condition of the asset 12 is present, the method and system 10 can additionally and optionally implement a determine asset fault cause procedure 60 to determine the cause of the fault. For example, compare the pattern of individual residual error values, $R_i$, contained in the residual error vector, R, to one or more patterns associated with degradation, events, or failure modes of the asset 12 that are known to cause faults having the pattern indicated. Additionally, the method and system 10 can also employ the communicate for surveillance or control action procedure 70 implemented by way of communication means 71 for the purpose of informing the asset operator or owner of the cause of a fault via, for example, the operator console alarm and data display 86 for enabling the asset operator or owner to take control action thereupon via, for example, asset control means 84 and/or for the purpose of directly enabling an automated control action via the asset control means 84 as a result of the determined cause of the fault.

The asset surveillance method and system 10 is further comprised of a more data procedure 72 for determining whether a new current data value vector is available for processing. If so, repeat the steps of the asset surveillance method and system 10 for the new current data vector beginning at the acquire current data vector procedure 26. If more data is not available, implement the surveillance complete procedure 74.

Figure 7:
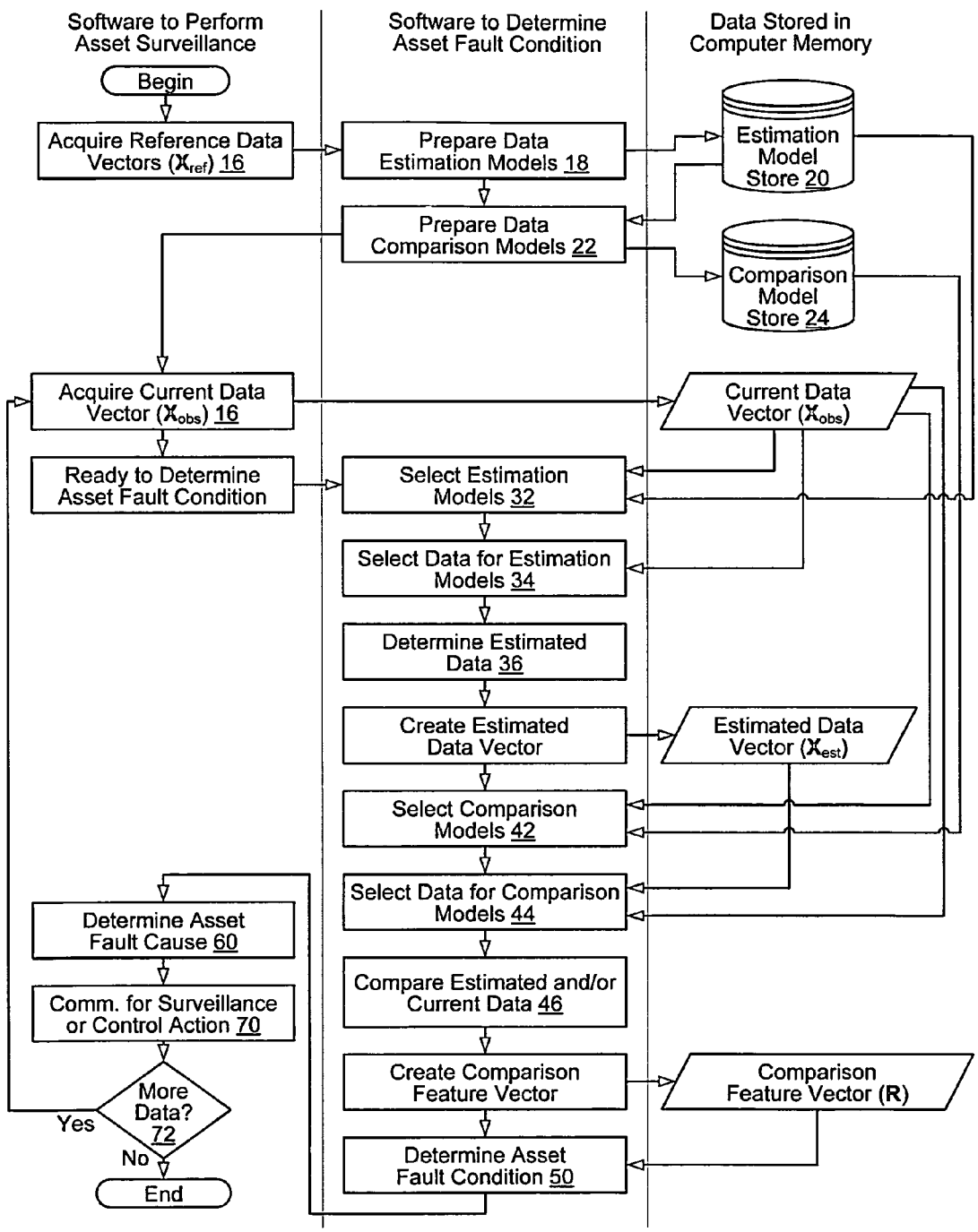
FIG. 7 is a detailed flow chart of an embodiment of an asset surveillance method comprising a dynamic model framework.
Figure 10:
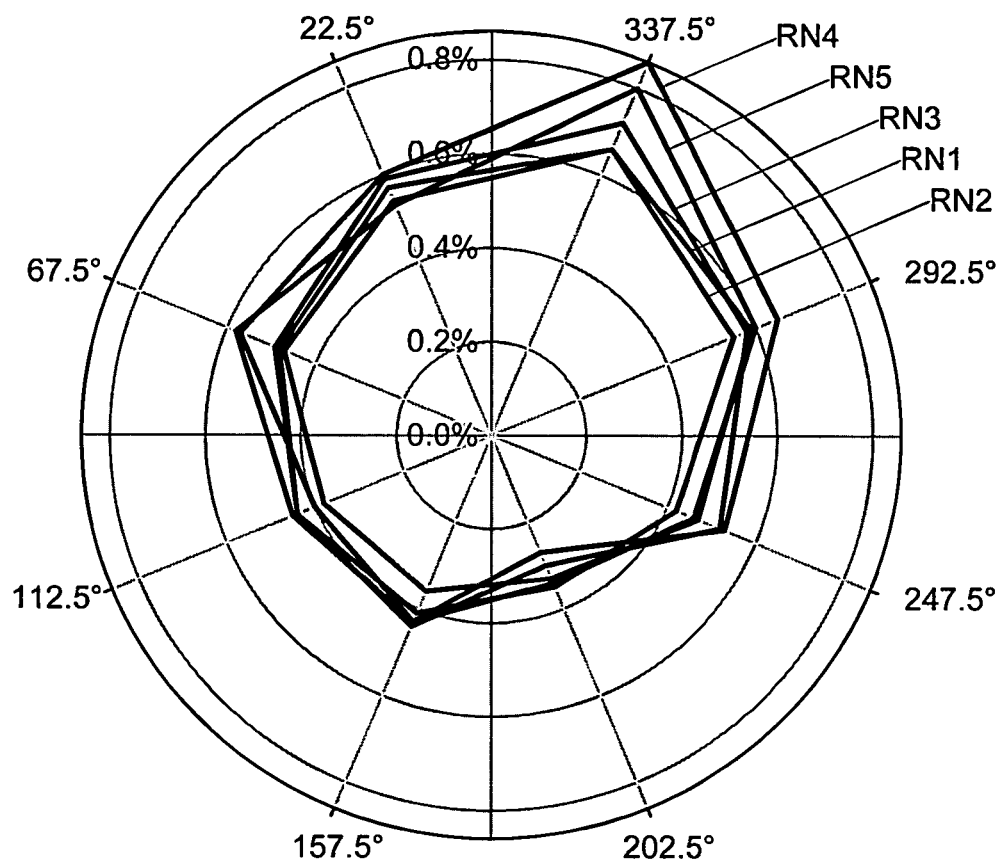
FIG. 10 illustrates a RMS error percent metric for steady-state pressure ratio signals at low subsonic Mach conditions.
Figure 11:
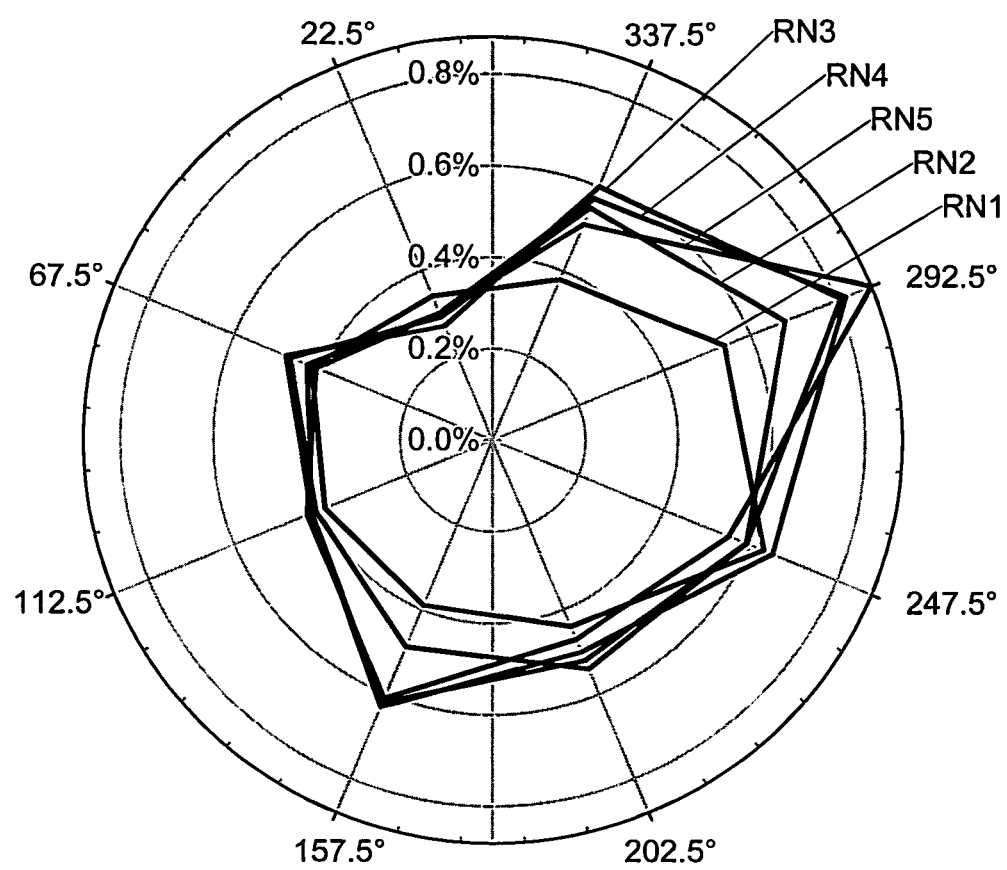
FIG. 11 illustrates a RMS error percent metric for steady-state pressure ratio signals at high subsonic Mach conditions.
Figure 12:
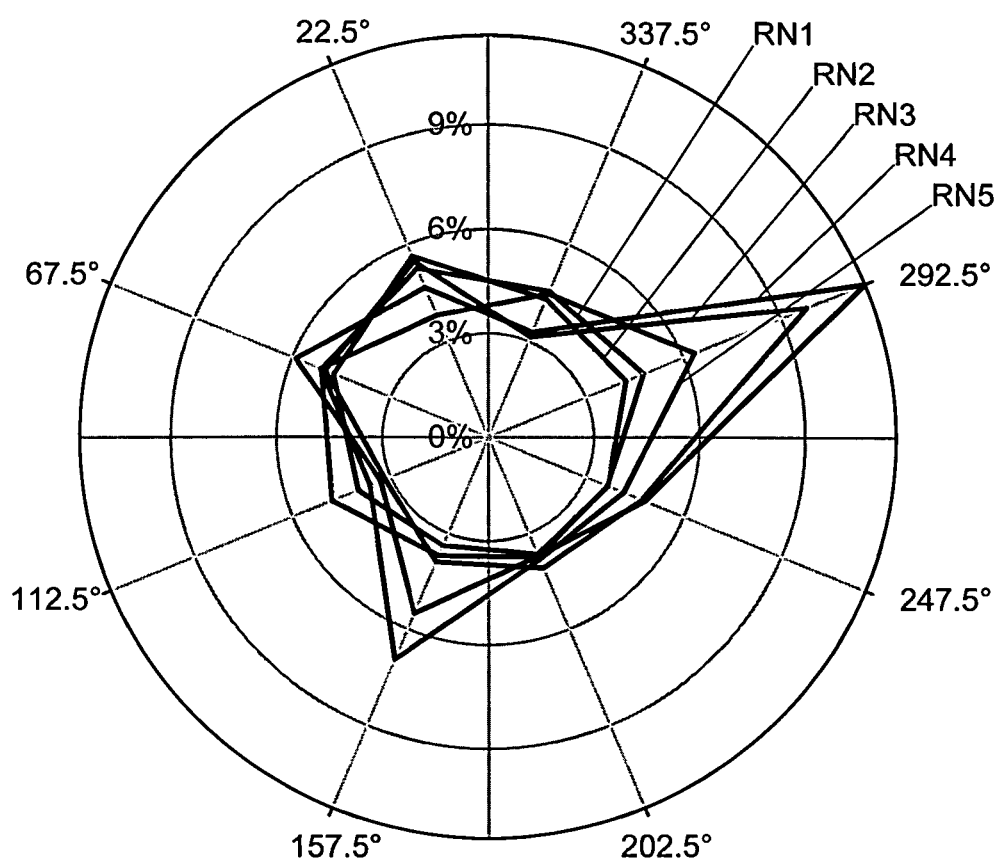
FIG. 12 illustrates a RMS error percent metric for high response RMS pressure ratio signals at low subsonic Mach conditions.
Figure 13:
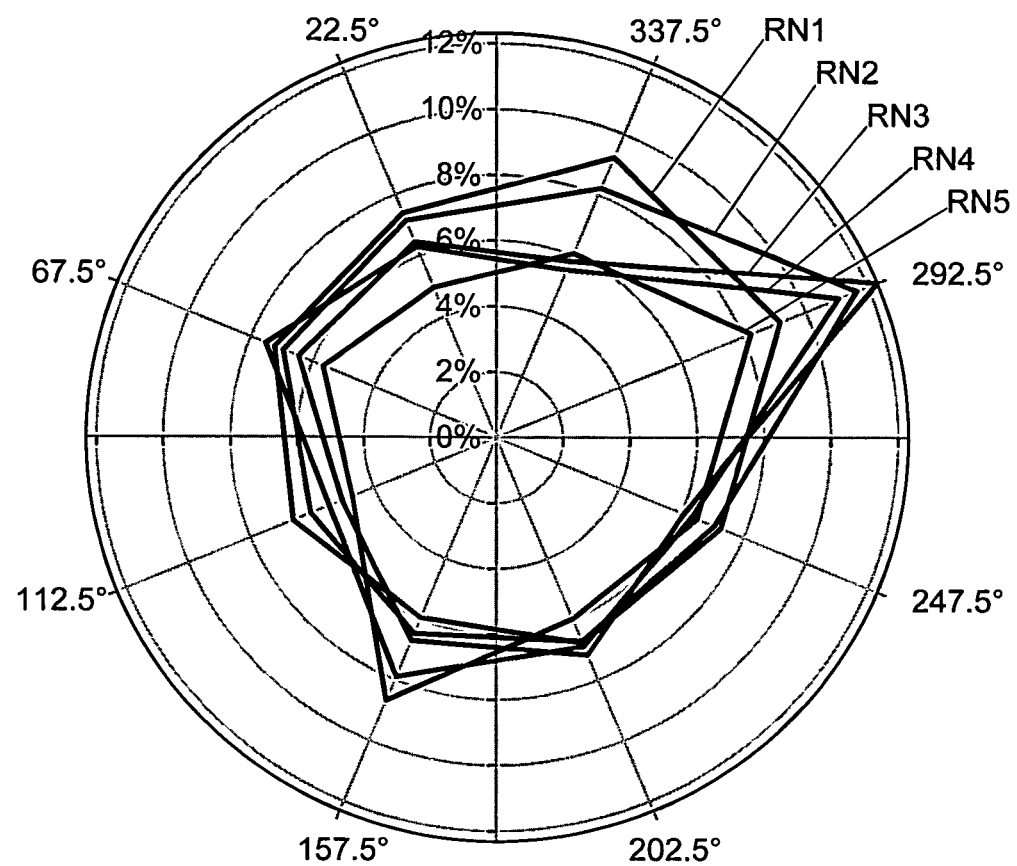
FIG. 13 illustrates a RMS error percent metric for high response RMS pressure ratio signals at high subsonic Mach conditions.

FIG. 7 illustrates a detailed flow chart of one embodiment of the asset surveillance method and system 10 that implements the asset surveillance method and system 10 on the computer 80.

In one aspect, an embodiment of the invention provides a computer readable medium 81 having a program recorded thereon in which the program causes, in use, a computer 80 running the program to execute an embodiment of the asset surveillance method and system 10 as flowcharted in FIG. 7.

Any type of computer readable medium 81 may be employed and examples include floppy disks, conventional hard disks, CD-ROMS, Flash ROMS, nonvolatile ROM, and RAM.

One skilled in the art will recognize that the order of steps described herein for the asset surveillance method and system 10 can be changed while equivalently accomplishing the results of the instant invention as described hereinbelow by the claims.

In use and operation, and referring to FIGS. 1 through 18, the method and system 10 will be further exemplified by gas turbine engine inlet surveillance models developed and tested using the asset surveillance method and system 10 under work for the United States Air Force Material Command, sponsored through the Arnold Engineering Development Center.

In one embodiment, software was developed that implements the asset surveillance method and system 10 to accomplish fault condition determination and fault cause determination for an engine inlet asset 12. Results show that the surveillance method and system 10 accurately estimates the relevant nonlinear physics represented in the engine inlet data. The engine inlet surveillance estimation and comparison models exhibit good generalization capabilities when presented with test data not used for model development. In this embodiment, the surveillance method and system 10 is designed to detect signal data errors and perform engine inlet diagnostics with higher accuracy and faster response time than existing techniques. This capability improves the speed and accuracy of both ground and flight engine test data analysis and enables faster and more accurate decisions to certify or maintain an engine system in both test and operational environments.

Engine inlet surveillance estimation and comparison models were developed based on wind tunnel test data for a subscale model of an aircraft engine inlet. The subscale inlet model test configuration was a subscale representation of the production aircraft external duct and inlet duct geometry from the nose to the aerodynamic interface plane (AIP) of the engine. Duct lines reflect the production aircraft configuration with fully modeled inlet and bleed and bypass systems. Flow blockage associated with the engine fan and fan nose spinner was not simulated.

A typical wind tunnel engine inlet instrumentation array for measuring inlet recovery and flow distortion is composed of eight equiangular-spaced rakes with five probes per rake located at the centroids of equal areas as illustrated in FIG. 8. The number 1 rake for the subscale model test configuration was located 22.5 deg counterclockwise from top dead center (forward looking aft). High response and steady-state pressures were measured at each of five radial locations for each of eight circumferential rake positions.

To aid in flight inlet performance analysis, software tools were developed to model the subscale wind tunnel data thereby facilitating a comparison of flight data with the performance expected based on subscale wind tunnel tests. The software tools enable the development of empirical estimation and comparison models from simulation, test, or in-service data.

Using the select modeled signals or data sources procedure 14, eighty-eight signals correlative to the operation of the engine inlet asset 12 were selected to be monitored by the asset surveillance method and system 10 using empirical estimation and comparison models. A total of eighty-four (84) flow descriptors were selected for estimation by the models. These were: average engine-face total pressure recovery; average engine-face RMS turbulence; circumferential distortion intensity; tip radial distortion intensity; ratio of individual steady-state total-pressure to free stream total pressure at each of 40 rake locations; and ratio of RMS of high response pressure to engine-face total-pressure at each of 40 rake locations. Four (4) additional signals were selected as input to the models. These were: Mach number; angle-of-attack; angle-of-sideslip; and corrected airflow. The nomenclature used in these models and in the following figures is summarized in FIG. 9.

Using the data acquisition and digitization means 16 provided by the wind tunnel facility, 8,851 sets of subsonic reference data values were acquired for the eighty-eight selected signals. The steady-state and high-response pressure signals measured by the test facility instrumentation were suitably transformed by the facility data acquisition and digitization means 16 to provide the eighty-eight input signals.

Separate low-subsonic and high-subsonic models were developed for each flow descriptor because the inlet characteristics can change substantially as a function of Mach number. The software implementation of the asset surveillance method and system 10 provides the ability to automatically partition an overall model for each distinct mode of asset operation. Once this logic is defined, the software will automatically configure unique sets of estimation models and comparison models for each operating mode. This enables the estimation and comparison model parameters to be optimized separately for each operating mode and allows the software to simultaneously improve prediction accuracy, reduce false alarm rate, and minimize real-time processing burden in comparison to unpartitioned models. In this case, the select estimation models procedure 32 and the select comparison models procedure 42 use the current data value of the Mach number signal to select the models used to determine the asset fault condition.

Using the prepare data estimation models procedure 18, eighty-four (84) flow descriptor data estimation models correlative to the reference data values were created for each of the two operating modes (low-subsonic and high-subsonic) and stored in the estimation model store 20 using the memory means 82 (J=84+84=168).

Using the prepare data comparison models procedure 22, one hundred and sixty eight (168) flow descriptor data comparison models correlative to the reference data values and their corresponding estimated data values from the data estimation models were created for each of the two operating modes (low-subsonic and high-subsonic) and stored in the comparison model store 24 using the memory means 82 (K=168+168=336).

The inlet flow descriptor models were then evaluated over the wind tunnel data to determine their baseline performance. The facility data acquisition and digitization means 16 was used in combination with the acquire current data vector procedure 26 to acquire each current data vector, $\vec{X}_{obs}$, from the wind tunnel data.

Using the determine estimated data vector procedure 30, the estimated data vector, $\vec{X}_{est}$, was computed using the set of eighty-four estimation models selected by the select estimation models procedure 32. The select estimation models procedure 32 examines the Mach number value in the current data vector to select the estimation model set from the estimation model store 20 based on the operating mode (low-subsonic or high-subsonic). The select data for estimation models procedure 34 is used to ensure that each of the selected models receives the input data needed to function correctly. The determine estimated data procedure 36 is then operated over each of the set of eighty-four estimation models to produce eighty-four estimated data values to populate the estimated data vector, $\vec{X}_{est}$, correlative to the eighty-eight current data values in the current data vector, $\vec{X}_{obs}$.

Using the compare estimated and current vectors procedure 40, the estimated data vector, $\vec{X}_{est}$, was compared to the current data vector, $\vec{X}_{obs}$, to produce the comparison feature vector, $\vec{R}$. The comparison feature vector is determined using the set of three hundred thirty-six comparison models in the comparison model store 24 from which one hundred sixty-eight comparison models are selected by the select comparison models procedure 42. The select comparison models procedure 42 examines the Mach number value in the current data vector to select the comparison model set from the comparison model store 24 based on the operating mode (low-subsonic or high-subsonic). The select data for comparison models procedure 44 is used to ensure that each of the selected models receives the input data needed to function correctly. The compare estimated and current data procedure 46 is then operated over each of the set of one hundred sixty-eight comparison models to produce one hundred sixty-eight comparison feature values correlative to the eighty-eight current data values in the current data vector, $\vec{X}_{obs}$.

In this application, the comparison models operate by computing the difference between the estimated data value and the current data value for a flow descriptor signal. The computed difference value is termed a residual value. Using the determine asset fault condition procedure 50, the software compares the individual residual values to threshold limits to determine if one or more limits are exceeded for one or more individual signals or data sources. Two comparison models are defined for each flow descriptor signal. One of these determines whether the current data value is uncharacteristically larger than the estimated data value (termed a high alert). The other determines whether the current data value is uncharacteristically smaller than the estimated data value (termed a low alert). Thus, the comparison feature vector, $\vec{R}$, contains one hundred sixty-eight individual features descriptive of whether each of the eighty-four flow descriptor signals is in a high alert condition, or a low alert condition.

If the fault found procedure 58 determines that a degraded or fault condition of the asset 12 is present based on the results of the determine asset fault condition procedure 50, the software indicates the fault status of the asset using the communicate for surveillance or control action procedure 70 which highlights the flow descriptor signal box in red or yellow on a software data display screen which can be provided by the operator console alarm and data display 86 for the purpose of informing the asset 12 operator or owner of the surveillance result and/or for enabling the asset 12 operator or owner to take control action thereupon by way of, for example, asset control means 84.

If the fault found procedure 58 determines that a degraded or fault condition of the asset 12 is present, the determine asset fault cause procedure 60 is used to determine the cause of the fault. For example, if only one signal is in an alert condition, a display for the alert condition can be highlighted in red on the software data display screen to indicate that a failed sensor is the most likely cause. However, if several signals are in an alert condition simultaneously and the pattern of high or low alerts matches the signature of a known fault cause the signal displays are highlighted in yellow on the software data display screen and the specific fault cause matching the pattern is reported on the software data display screen.

Using the more data procedure 72, the software continues to process new current data vectors for as long as they are available for processing or until the user terminates the processing. If more data is not available, the surveillance complete procedure 74 is performed.

One comparison metric computed by the software is the root mean square (RMS) residual error value (the difference between the current value and estimated values) normalized by the RMS observed signal value, expressed as a percentage. The RMS Error % metric for the steady-state pressure ratio signals is plotted as a function of circumferential position for each radial ring number identified by RN1, RN2, RN3, RN4, and RN5 at the low subsonic Mach number conditions in FIG. 10 and at the high subsonic Mach number conditions in FIG. 11. Corresponding plots for the high response RMS pressure ratio signals are presented in FIG. 12 and FIG. 13. The RMS Error % metric is less than 1% for the steady-state pressure ratio signals and generally less than 10% for the high response RMS pressure ratio signals. These results show that consistently high quality estimates are produced by the estimation model set of the asset surveillance method and system 10.

The ability of the asset surveillance method and system 10 to automatically detect bad data and anomalous operating conditions greatly facilitated the test data assessment process. The inlet distortion descriptor data had been previously screened for outlier data items by conventional techniques and the database was considered by the test engineers to be "clean" of bad data. However, the asset surveillance method and system 10 was easily used to identify a number of additional data items in the database that might be considered bad, missing, or inconsistent with "normal" operation.

Figure 14:
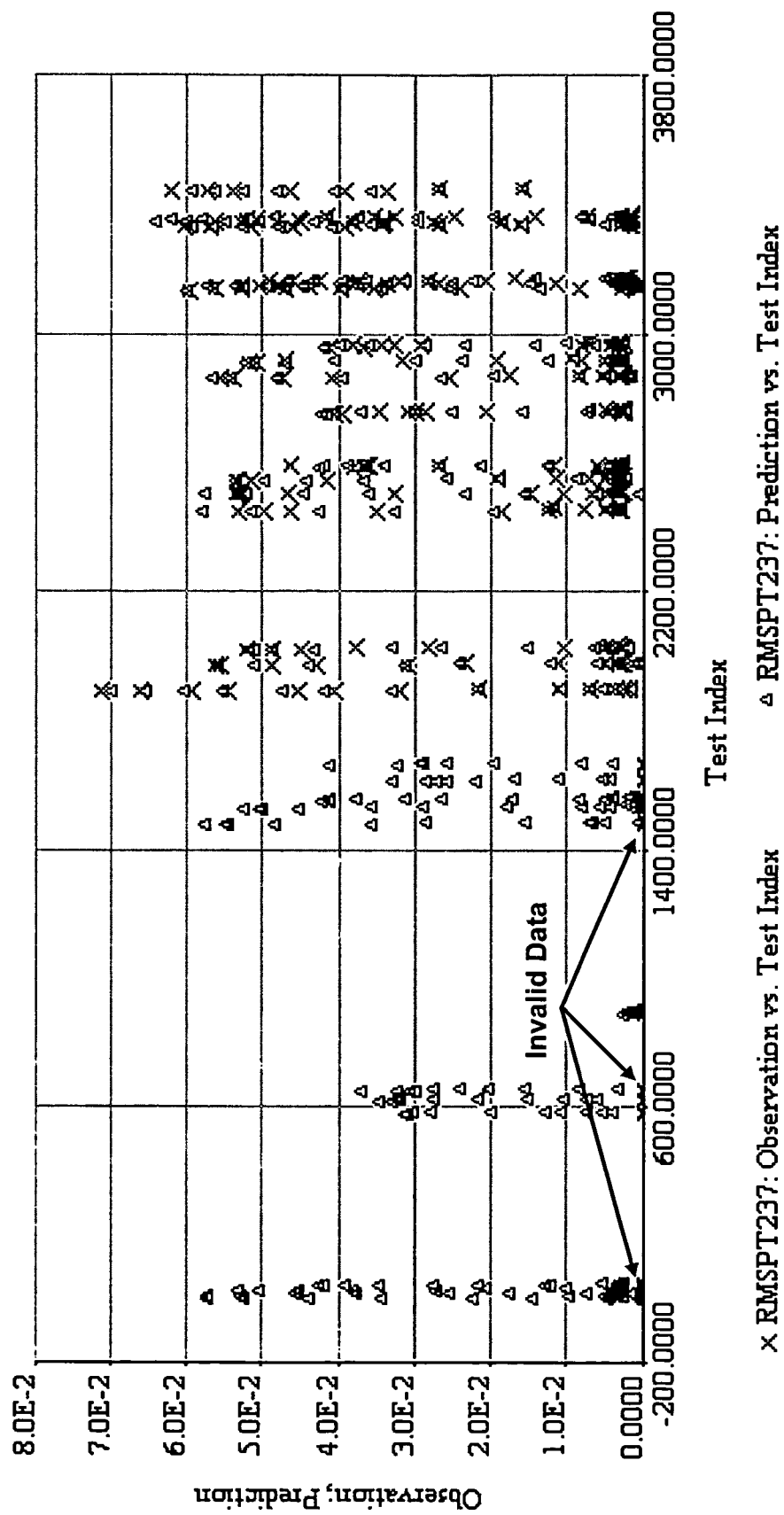
FIG. 14 illustrates a detection of invalid data values by comparing model estimated and observed high response RMS pressure ratio values versus test index.

Several of the signal data values were recorded as 0.0 during some of the tests. This is a common signature of data values that are known to be missing or incorrect at the time of data acquisition or data recording. In comparing the recorded data with the expected data from the estimation models, it may be seen in FIG. 14 that the models provide reasonable expected values for these signals. The recorded values are considered invalid when they are not representative of the actual values of the signals. In this figure, the "x" symbols are the recorded values of the high response RMS pressure ratio and the delta "Δ" symbols are the model predicted high response RMS pressure ratio values for each observed value. In one embodiment, the software automatically generates an alert when an inconsistency between the observed and expected values is detected. Subsequent inspection of the wind tunnel database confirms that the parameter values noted as invalid in FIG. 14 are missing and have been replaced with values of 0.0. There were multiple instances of this type of bad or missing data identified by the software within the "clean" wind tunnel database.

Figure 15:
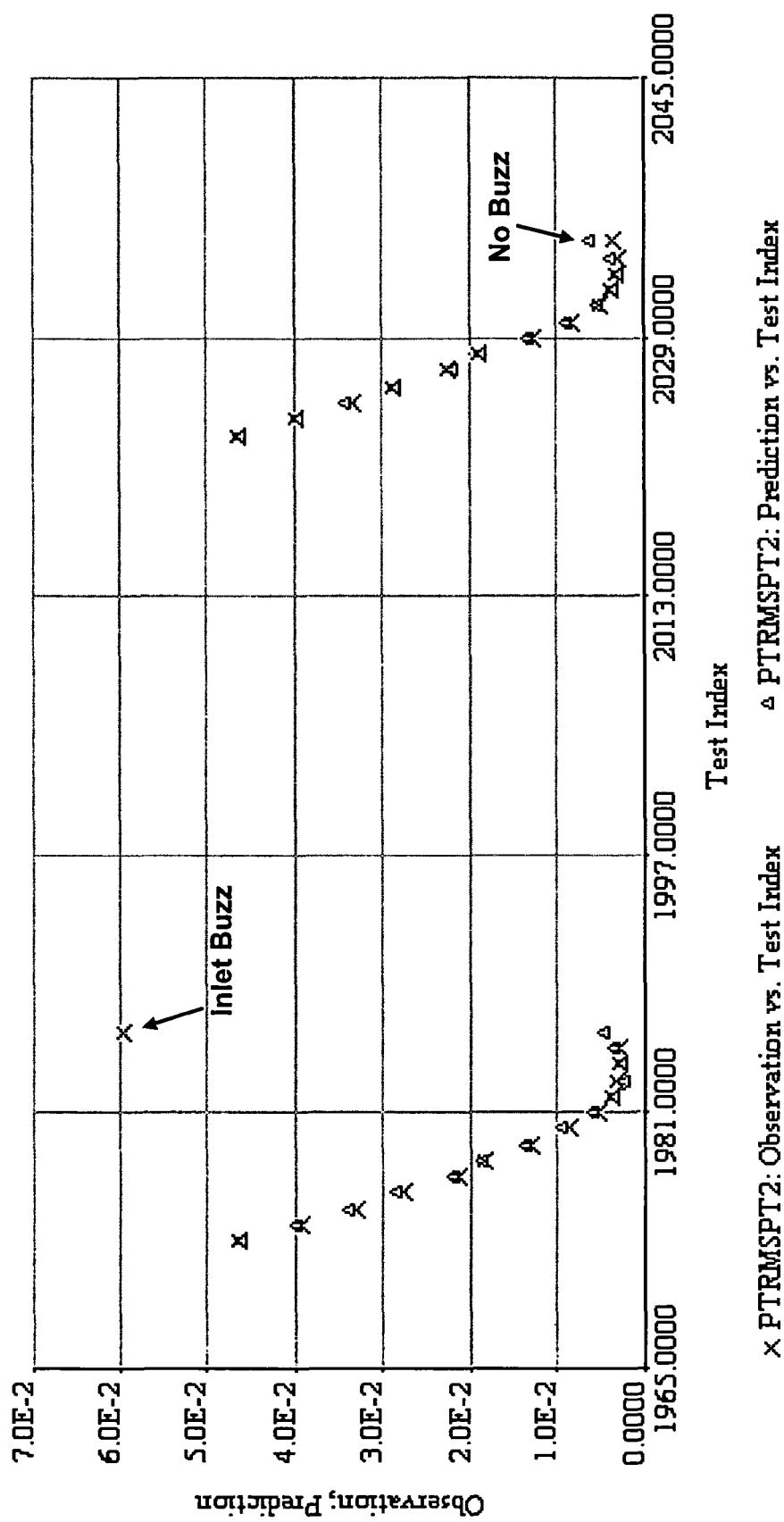
FIG. 15 illustrates a detection of an inlet buzz condition by comparing model estimated and observed average RMS turbulence values versus test index.
Figure 16:
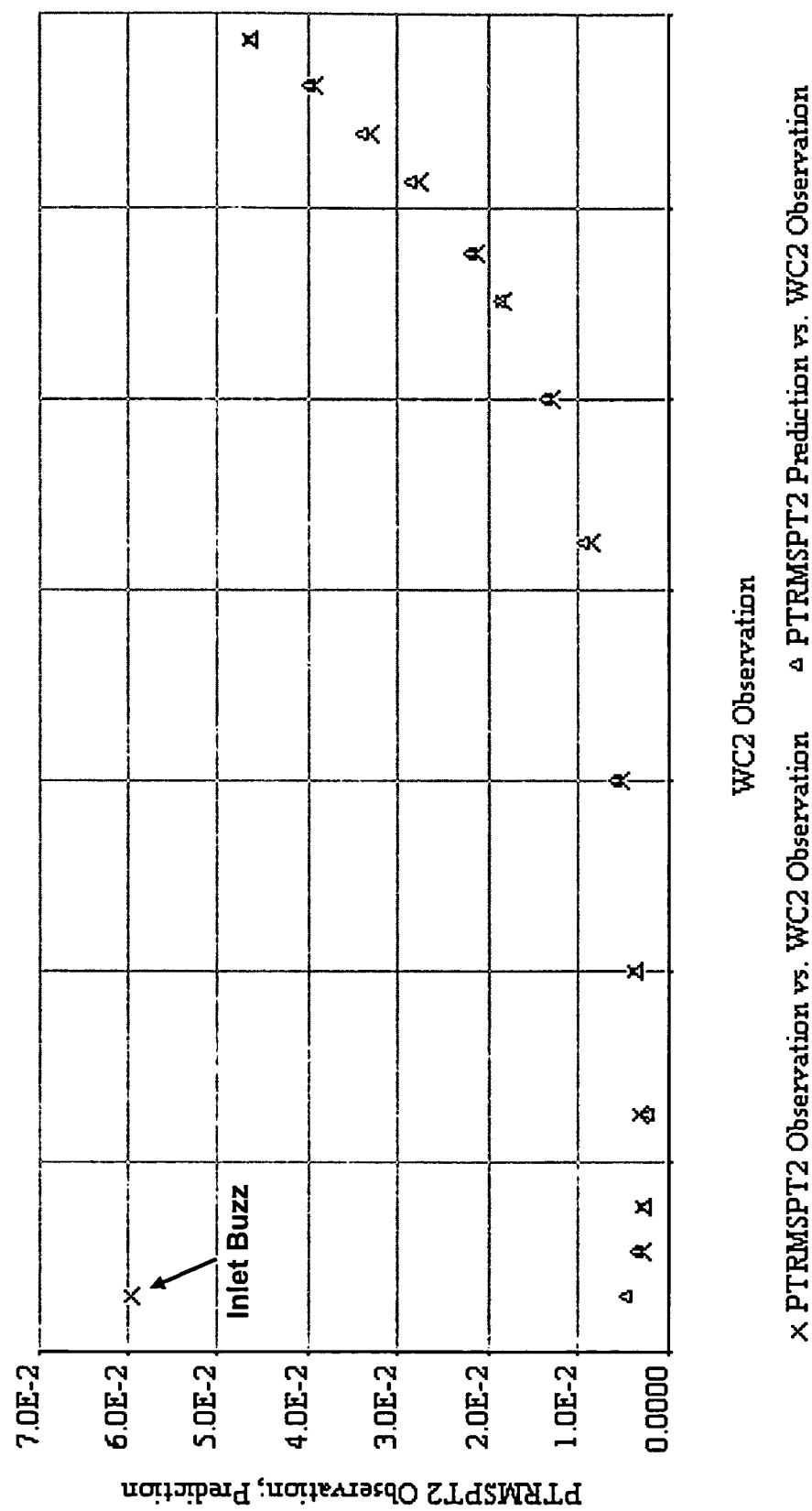
FIG. 16 illustrates a detection of an inlet buzz condition by comparing model estimated and observed average RMS turbulence values versus airflow.
Figure 17:
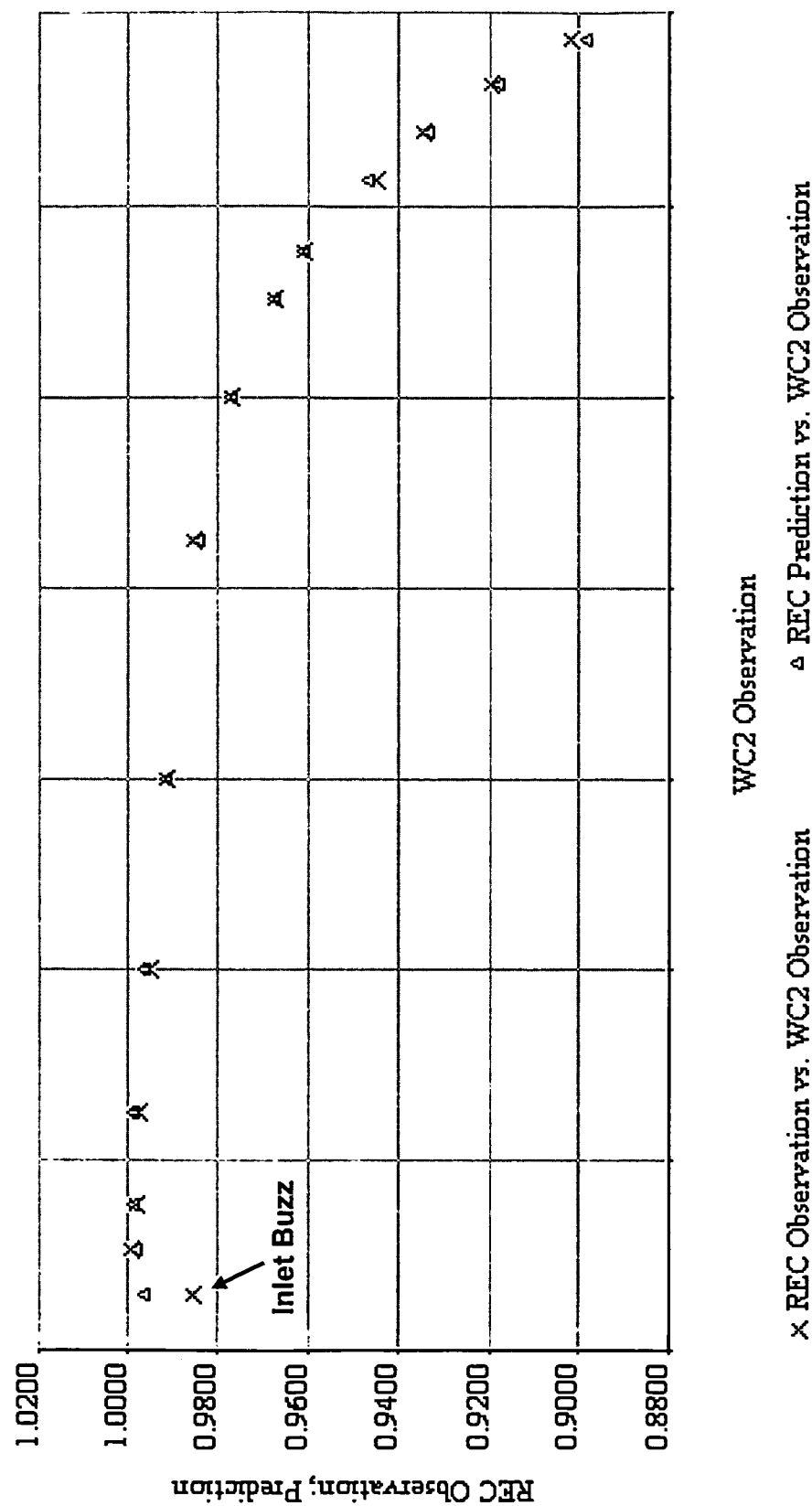
FIG. 17 illustrates a detection of an inlet buzz condition by comparing model estimated and observed average total-pressure recovery values versus airflow.

In another example, the software detected the presence of "buzz" at the engine inlet for several operating points within the database. Buzz is a low frequency oscillation that is the result of harmonic separation and reattachment of flow in the duct that may occur at low inlet mass flow ratio (Mattingly, J., *Elements of Gas Turbine Propulsion*, McGraw-Hill, Inc., New York, N.Y., 1996). If buzz occurs at transonic or supersonic conditions when a shock is present, the magnitude of the buzz can be significantly exacerbated, which may result in engine stall or flameout. The signature of buzz is a sudden in-phase increase in high response RMS pressure as airflow is decreased, as shown in FIG. 15, which is usually accompanied by a drop in the total-pressure recovery value. Confirmation of the inlet buzz is seen in the variation of high response RMS pressure ratio, FIG. 16, and total-pressure recovery, FIG. 17, with respect to corrected airflow.

The buzz condition data is within the normal operating range for wind tunnel testing and was not considered anomalous by the test and development team until after it was detected by the asset surveillance method and system 10. The buzz detection example demonstrates the expected benefit of improved efficiency and accuracy for online diagnostic monitoring of Air Force assets that result from the use and operation of the asset surveillance method and system 10. Using software to implement the asset surveillance method and system 10, it was shown that real-time data validation and equipment surveillance can be quickly and automatically performed over large data sets to ensure that only high quality data is used for real-time test operations support and subsequent data analysis.

Figure 18:
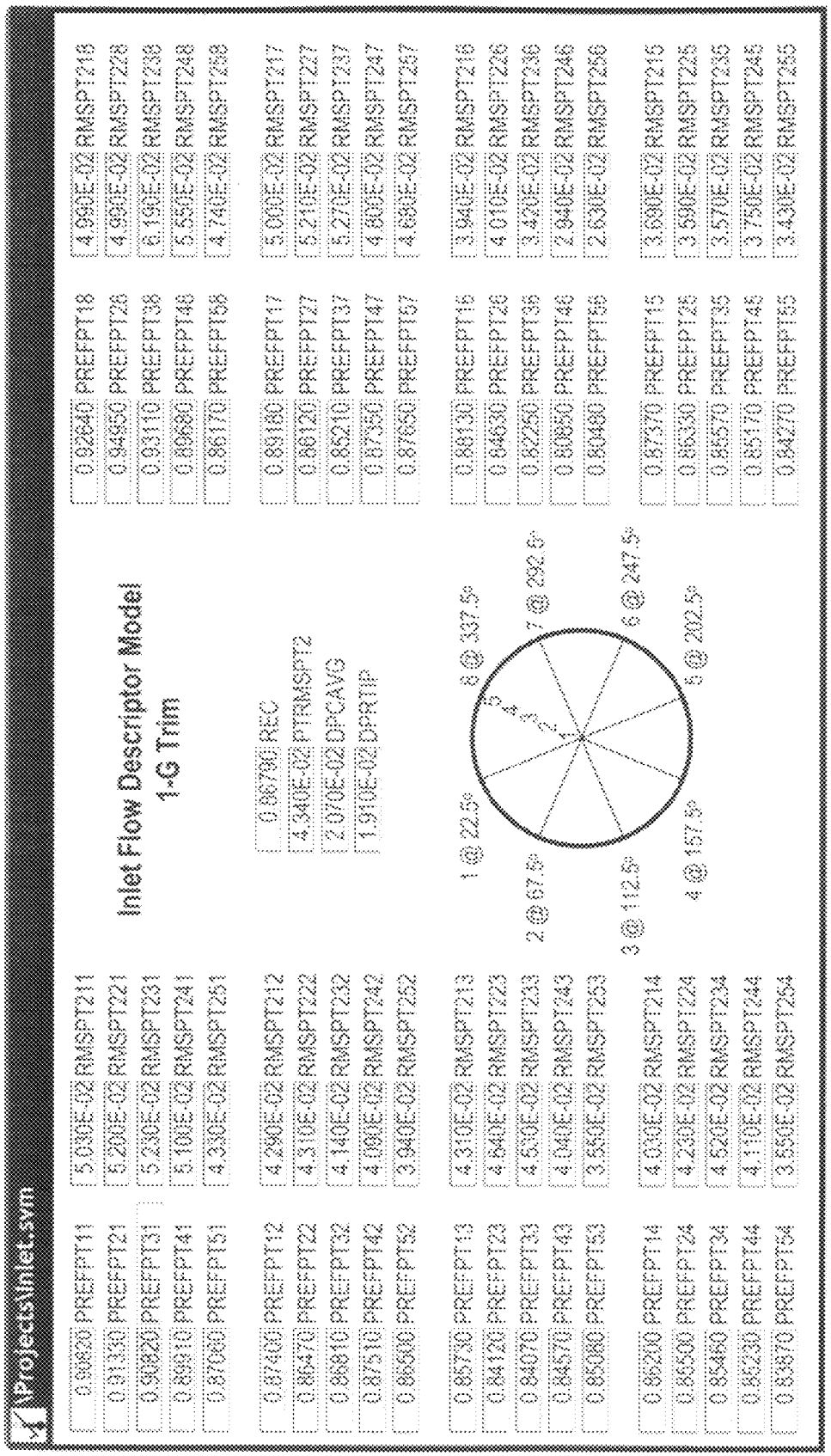
FIG. 18 illustrates a software data display screen used to communicate an engine inlet fault condition for surveillance or control action.

Engine condition monitoring using the asset surveillance method and system 10 can provide engine test engineers with early indications of deteriorating sensors or equipment, and operating problems. FIG. 18 illustrates a software data display screen which can be provided by the operator console alarm and data display 86 and which is used to communicate an engine inlet fault condition to an engine test engineer for surveillance or control action. With early warning of developing problems, operators might be able to take earlier corrective action, thus increasing the productivity of the test effort. The ability to detect a fault condition by comparing current data to expected normal operating data provides a more sensitive detection capability than traditional signal value range limits currently used by engine test engineers.

Figure 19:
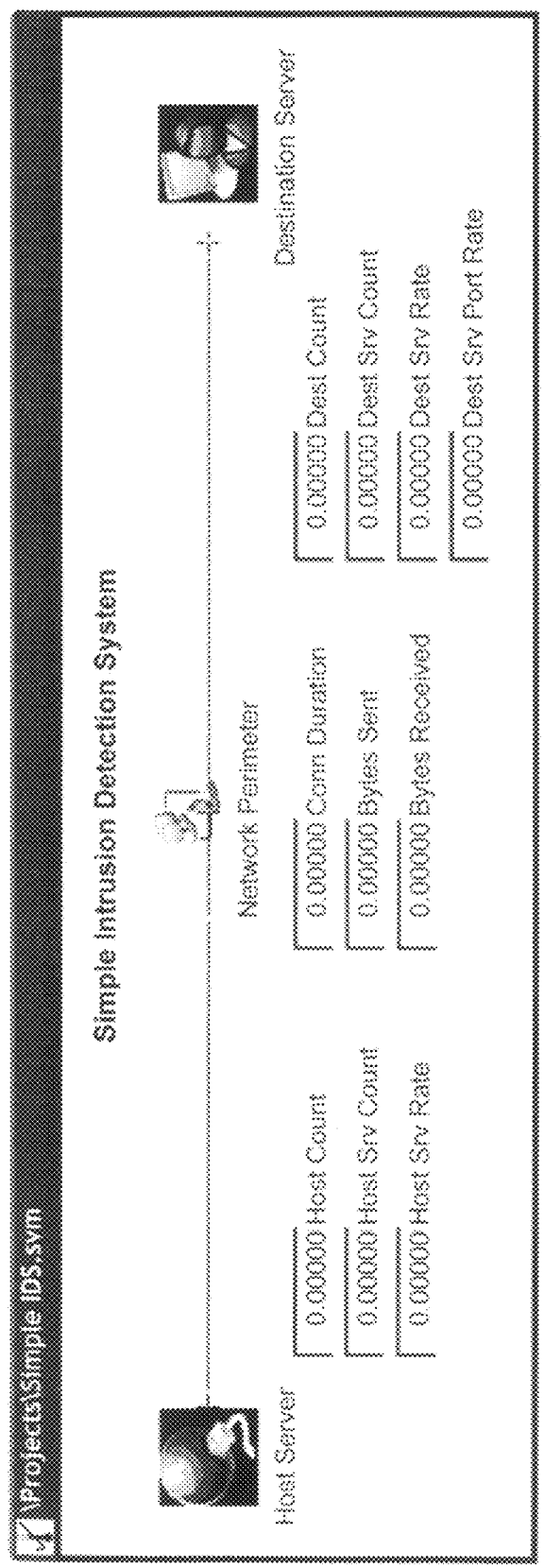
FIG. 19 illustrates a software data display screen used to communicate a computing system intrusion alarm fault condition for surveillance or control action.

In use and operation, and referring to FIG. 19 and back to FIGS. 1 through 7, the method and system 10 will be further exemplified by computing system surveillance models developed and tested using the method and system 10 under work for the United States Department of Interior, sponsored through the Homeland Security Advanced Research Project Agency.

Originally, process control and data acquisition computing systems were designed to provide stand-alone, proprietary control and data acquisition for a single, isolated process or equipment component. These process control and data acquisition computing systems had inherently limited scope and connectivity with other computing systems. Today, process control and data acquisition computing systems are increasingly inter-connected with other computing systems and are often accessible via the Internet. This means that many more people have access to them than was intended originally. Along with the convenience and business advantages of inter-connection comes an increased risk of cyber intrusion and attack. Compounding these challenges is that standard operating systems and applications with large numbers of well-known vulnerabilities are often used to achieve cost-effective and affordable computing system price points. As process control and data acquisition computing systems increasingly use these standard technologies for command and control, they are also adopting a broad base of vulnerabilities and adversaries. Adding wireless connectivity and access to the mix compounds this already serious problem. The vulnerability of process control and data acquisition computing systems to unauthorized access is well documented.

Many difficult issues arise when implementing an intrusion detection system for a computing system. Today's intrusion detection systems often generate huge quantities of data that are unmanageable for effective monitoring. Security teams are usually unable to make practical use of this data. Compounding the challenges in managing this data are the many "false positives" reported. A solution is needed that automatically sorts through this vast amount of data and identifies only the most probable security threats requiring expert analysis and intervention. In work for the Homeland Security Advanced Research Project Agency, the asset surveillance method and system 10 was shown to provide such solution.

An intrusion detection system event database recorded from an operating network of process control and data acquisition computing devices was obtained from a public utility and was modeled and evaluated using the method and system 10. The event database contained nineteen distinct types of false alarms. The method and system 10 was configured to provide computing system surveillance for eliminating the seven most frequent false alarm types. The event database contained 15,992 false alarms for the seven most frequent false alarm types.

Software was implemented and surveillance for the following alarm types was performed using the method and system 10.

ICMP L3 Retriever Ping—ICMP packets that contain a specific data payload trigger this alarm.

ICMP Ping Nmap—ICMP packets containing no data payload trigger this alarm. This is representative of a ping scan generated using a network mapping tool.

Evasive RST—TCP packets having the RST flag set trigger this alarm. This generally happens when an intruder does an ACK scan. The victim replies with a RST packet if it receives an out of sync ACK packet on an open or closed port.

NetBIOS SMB IPC Share Access—This alarm is triggered when an intruder tries to open a named pipe to the victim machine using the IPC$ share.

SNMP Public Access UDP—This alarm is triggered when an SNMP connection over UDP using the default 'public' community is made.

TCP Checksum Changed on Retransmission—TCP packets containing invalid checksums trigger this alarm. Sending packets with invalid checksums is a step in the 'fragroute' program commonly used to evade intrusion detection systems.

ICMP Large ICMP Packet—ICMP packets containing excessively large payloads trigger this alarm.

The select modeled signals or data sources 14 procedure was used to select the event data sources 15 characteristic of each alarm type. A database reader utility was used to provide the data acquisition and digitization means 16.

The first 7,755 event data vectors in the event database were used as reference data vectors to prepare data estimation models 18 for each alarm type and prepare data comparison models 22 for each of the event data values characteristic of each alarm type. The data estimation models were saved in the estimation model store 20 and the data comparison models were saved in the comparison model store 24.

The last 8,037 event data vectors in the event database were used to test the effectiveness of the method and system 10 for determining the presence and cause of intrusion alarm fault conditions while screening out false alarms.

The acquire current data vector procedure 26 was used in combination with the database reader utility 16 to select and process each of the 8,037 event data vectors. For each current data vector, the estimation model and comparison models indicated by the event type data value were used to determine an estimated data vector 30 and then to compare the estimated and current vectors 40 to determine a comparison feature vector. The computing system intrusion alarm fault condition 50 and alarm fault cause 60 were determined from the comparison feature vector. The software data display used to communicate results for surveillance or control action 70 is illustrated in FIG. 19 and can be provided by the operator console alarm and data display 86. An overall reduction of greater than 99.5% in the number of false alarms was achieved. Details of the results obtained are summarized in FIG. 20.

Using software to implement the asset surveillance method and system 10, it was shown possible to more accurately identify security threats to computing systems automatically. This capability will shorten the time required to identify and respond to a threat and enables more efficient use of manpower resources.

Moreover, it should be apparent that numerous modifications and adaptations may be resorted to without departing from the scope and fair meaning of the instant invention as set forth hereinabove and as described herein below by the claims.

I claim:

1. A method for performing surveillance of an asset, said method comprising the steps of:
    populating a memory means with a plurality of different estimation models;
    obtaining a current data vector correlative to current asset operation wherein the current data vector is comprised of current data vector values;
    selecting an estimation model set from the plurality of different estimation models as a function of the current data vector;
    apportioning the current data vector values to the selected estimation model set by separating the current data vector values into a plurality of separated current data vector values and providing at least one separated current data vector value to at least one estimation model in the selected estimation model set;
    determining at least one estimated data vector value from each estimation model in the selected estimation model set for which at least one separated current data vector value is apportioned for obtaining an estimated data vector; and
    using the estimated data vector for performing asset surveillance.

2. The method of claim 1 further comprising a step of comparing the at least one estimated data vector with the current data vector for determining a comparison feature vector.

3. The method of claim 2 wherein the step of comparing the at least one estimated data vector with the current data vector further comprises the steps of populating the memory means with a plurality of different comparison models and selecting a comparison model set from the plurality of different comparison models as a function of at least the current data vector or the estimated data vector.

4. The method of claim 3 wherein the step of comparing the at least one estimated data vector with the current data vector further comprises apportioning at least one pair of data vector values comprised of one of the separated current data vector values and an estimated data vector value included in the at least one estimated data vector to at least one comparison model in the selected comparison model set.

5. The method of claim 4 further comprising a step of comparing the separated current data vector value to the estimated data vector value in the at least one pair of data vector values for determining the comparison feature vector.

6. The method of claim 5 further comprising a step of determining a fault condition as a function of the comparison feature vector.

7. The method of claim 6 further comprising a step of providing a control action as necessitated by each determined fault condition.

8. The method of claim further comprising a step of determining a fault cause for each determined fault condition.

9. The method of claim 8 further comprising a step of providing a control action as necessitated by each determined fault cause.

10. A method for performing surveillance of an asset, said method comprising the steps of:
    populating a memory means with a plurality of different comparison models:
    obtaining a current data vector correlative to current asset operation wherein the current data vector is comprised of current data vector values;
    selecting a comparison model set from the plurality of different comparison models as a function of the current data vector;
    apportioning the current data vector values to the selected comparison model set by separating the current data vector values into a plurality of separated current data vector values and providing at least one separated current data vector value to at least one comparison model in the selected comparison model set;
    determining at least one comparison feature vector value from each comparison model in the selected comparison model set for which at least one separated current data vector value is apportioned for obtaining a comparison feature vector; and
using the comparison feature vector for performing asset surveillance.

11. The method of claim 10 further comprising a step of determining a fault condition as a function of the comparison feature vector.

12. The method of claim 11 further comprising a step of providing a control action as necessitated by each determined fault condition.

13. The method of claim 11 further comprising a step of determining a fault cause for each determined fault condition.

14. The method of claim 13 further comprising a step of providing a control action as necessitated by each determined fault cause.

15. A method for performing surveillance of an asset, said method comprising the steps of:
    populating a memory means with a plurality of different comparison models;
    obtaining an estimated data vector correlative to current asset operation wherein the estimated data vector is comprised of estimated data vector values;
    selecting a comparison model set from the plurality of different comparison models as a function of the estimated data vector;
    apportioning the estimated data vector values to the selected comparison model set by separating the estimated data vector values into a plurality of separated current data vector values and providing at least one separated estimated data vector value to at least one comparison model in the selected comparison model set;
    determining at least one comparison feature vector value from each comparison model in the selected comparison model set for which at least one separated estimated data vector value is apportioned for obtaining a comparison feature vector: and
using the comparison feature vector for performing asset surveillance.

16. The method of claim 15 further comprising a step of determining a fault condition as a function of the comparison feature vector.

17. The method of claim 16 further comprising a step of providing a control action as necessitated by each determined fault condition.

18. The method of claim 16 further comprising a step of determining a fault cause for each determined fault condition.

19. The method of claim 18 further comprising a step of providing a control action as necessitated by each determined fault cause.

20. A method for performing surveillance of an asset, said method comprising the steps of:
    obtaining a set of different estimation models and storing the set of different estimation models in a memory means;
    obtaining a set of different comparison models and storing the set of different comparison models in the memory means;
    obtaining a current data vector correlative to current asset operation;
    selecting an estimation model set from the stored set of different estimation models as a function of the current data vector;
    apportioning the current data vector values to the selected estimation model set by separating the current data vector values into a plurality of separated current data vector values and providing at least one separated current data vector value to at least one estimation model in the selected estimation model set;
    determining at least one estimated data vector value from each estimation model in the selected estimation model set for which at least one separated current data vector value is apportioned for obtaining an estimated data vector;
    selecting a comparison model set from the stored set of different comparison models as a function of at least the estimated data vector or the current data vector;
    determining a comparison feature vector from the selected comparison model set, the estimated data vector, and the current data vector; and
    using the comparison feature vector for performing asset surveillance.

21. The method of claim 20 further comprising a step of determining a fault condition as a function of the comparison feature vector.

22. The method of claim 21 further comprising a step of providing a con frog action as necessitated by each determined fault condition.

23. The method of claim 21 further comprising a step of determining a fault cause for each determined fault condition.

24. The method of claim 23 further comprising a step of providing a control action as necessitated by each determined fault cause.

25. A system for performing surveillance of an asset, said system comprising:
    a memory device having a plurality of different estimation models stored thereby;
    means for acquiring a current data vector correlative to current asset operation wherein said current data vector is comprised of current data vector values;
    means for selecting an estimation model set from said plurality of different estimation models as a function of said current data vector;
    means for apportioning the current data vector values to the selected estimation model set by separating the current data vector values into a plurality of separated current data vector values and providing at least one separated current data vector value to at least one estimation model in said selected estimation model set;
and
means for determining at least one estimated data vector value from each estimation model in said selected estimation model set for which at least one separated current data vector value is apportioned for obtaining an estimated data vector for use in performing asset surveillance.

* * * * *